US009983801B1

(12) United States Patent
Karnowski et al.

(10) Patent No.: US 9,983,801 B1
(45) Date of Patent: May 29, 2018

(54) PRIORITY QUEUEING FOR LOW LATENCY STORAGE NETWORKS

(71) Applicant: AVAGO TECHNOLOGIES GENERAL IP (SINGAPORE) PTE. LTD., Singapore (SG)

(72) Inventors: Mark J. Karnowski, Huntington Beach, CA (US); Jon Infante, Costa Mesa, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 294 days.

(21) Appl. No.: 14/309,875

(22) Filed: Jun. 19, 2014

Related U.S. Application Data

(60) Provisional application No. 61/880,919, filed on Sep. 21, 2013.

(51) Int. Cl.
*G06F 12/00* (2006.01)
*G06F 3/06* (2006.01)
*G06F 13/16* (2006.01)

(52) U.S. Cl.
CPC ............ *G06F 3/0611* (2013.01); *G06F 3/067* (2013.01); *G06F 3/0665* (2013.01); *G06F 3/0689* (2013.01); *G06F 13/1621* (2013.01)

(58) Field of Classification Search
CPC ....... G06F 3/0635; G06F 3/0659; G06F 3/067
USPC ........................................................ 711/114
See application file for complete search history.

(56) References Cited

U.S. PATENT DOCUMENTS

| 6,088,751 | A  | * | 7/2000 | Jaramillo | G06F 13/364 710/116 |
| 6,438,135 | B1 | * | 8/2002 | Tzeng | H04L 47/24 370/412 |
| 8,788,764 | B2 | * | 7/2014 | Williams | G06F 3/061 711/154 |
| 9,680,931 | B1 | * | 6/2017 | Karnowski | H04L 67/1097 |
| 2002/0138670 | A1 | * | 9/2002 | Johnson | G06F 13/20 710/6 |
| 2003/0122834 | A1 | * | 7/2003 | Mastronarde | G06F 13/161 345/535 |
| 2003/0177168 | A1 | * | 9/2003 | Heitman | H04L 67/1097 709/201 |
| 2005/0058147 | A1 | * | 3/2005 | Regnier | H04L 47/10 370/412 |
| 2005/0172043 | A1 | * | 8/2005 | Nonaka | G06F 3/0614 710/5 |
| 2006/0174073 | A1 | * | 8/2006 | Barnes | G06F 3/0605 711/158 |

(Continued)

Primary Examiner — Prasith Thammavong
(74) Attorney, Agent, or Firm — Sheridan Ross P.C.

(57) ABSTRACT

A method for a storage area network includes setting a priority indicator in a signal of a storage request to form a high priority storage request for a storage target in the storage area network. The method further includes transmitting the high priority storage request to the storage target before the transmission of at least one normal priority storage request. The high priority storage request then traverses the storage area network with a higher priority than a normal priority storage request to the storage target. Upon receiving the high priority storage request, the storage target executes the high priority storage request prior to executing at least one normal priority storage request.

20 Claims, 17 Drawing Sheets

(56) References Cited

U.S. PATENT DOCUMENTS

| | | | | |
|---|---|---|---|---|
| 2006/0176807 A1* | 8/2006 | Wu | .................... | H04L 12/5693 370/229 |
| 2008/0162735 A1* | 7/2008 | Voigt | .................... | G06F 3/0605 710/6 |
| 2008/0307130 A1* | 12/2008 | Chang | .................... | G06F 3/061 710/74 |
| 2010/0058000 A1* | 3/2010 | Moyer | ................ | G06F 12/0831 711/146 |
| 2011/0173608 A1* | 7/2011 | Buragohain | ........ | G06F 9/45558 718/1 |
| 2012/0159474 A1* | 6/2012 | Chakhaiyar | ........... | G06F 3/0689 718/1 |
| 2013/0042252 A1* | 2/2013 | Jalal | .................... | G06F 13/374 718/104 |
| 2013/0275835 A1* | 10/2013 | Aswadhati | .......... | G06F 11/1068 714/773 |
| 2014/0281045 A1* | 9/2014 | Chawla | .................... | G06F 3/00 710/6 |

\* cited by examiner

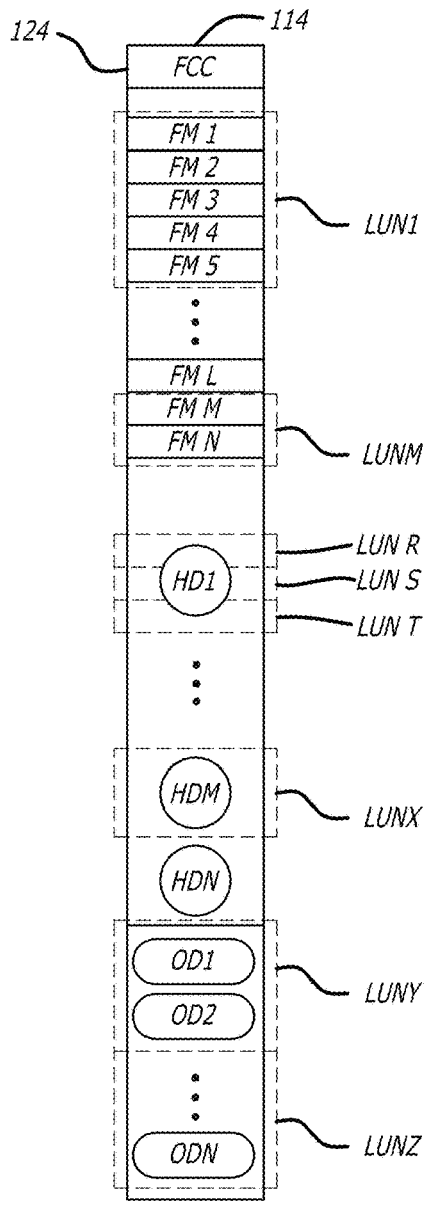
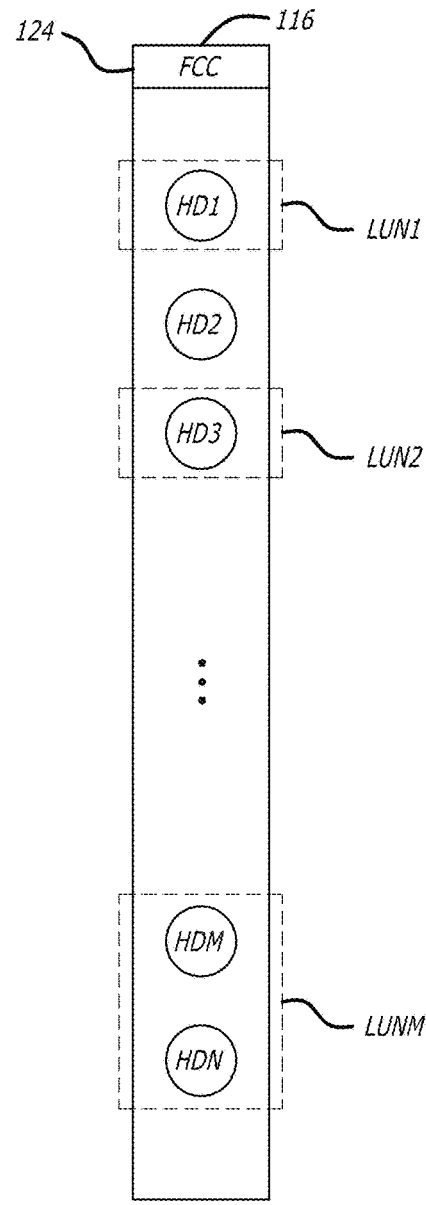
FIG. 2A  FIG. 2B
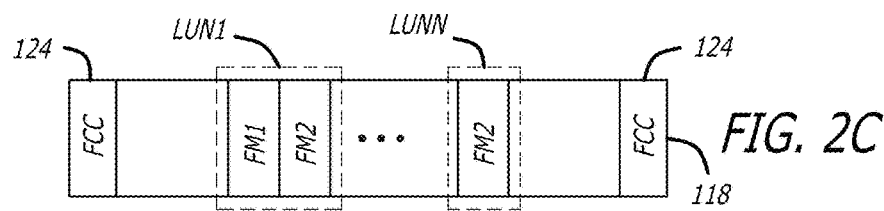
FIG. 2C

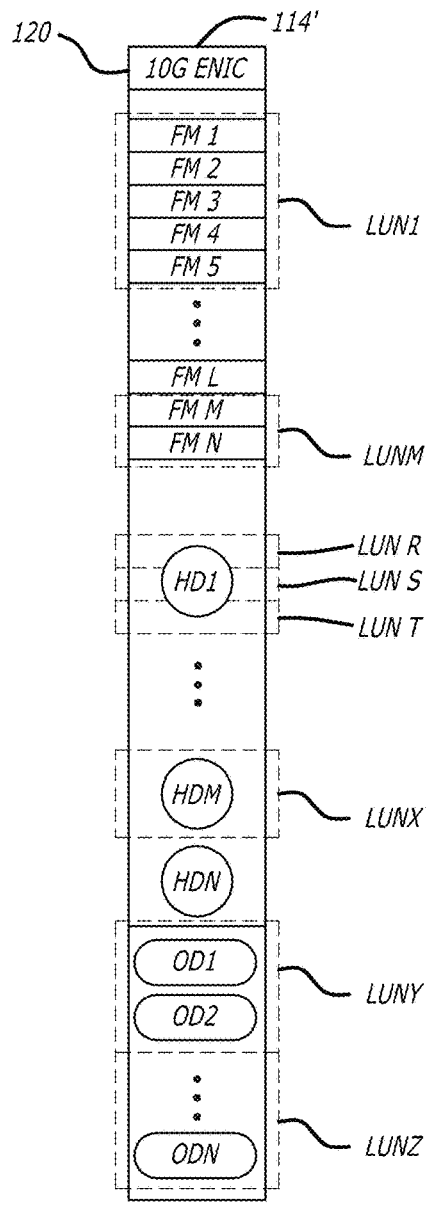
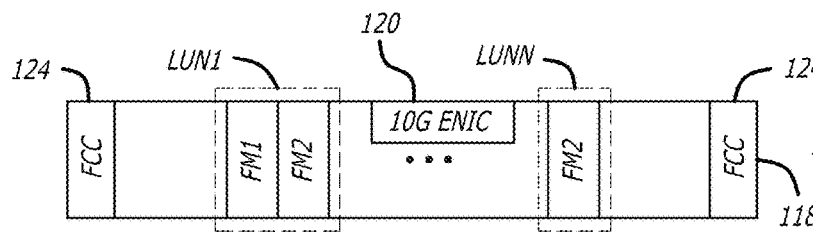
FIG. 2D
FIG. 2E
FIG. 2F

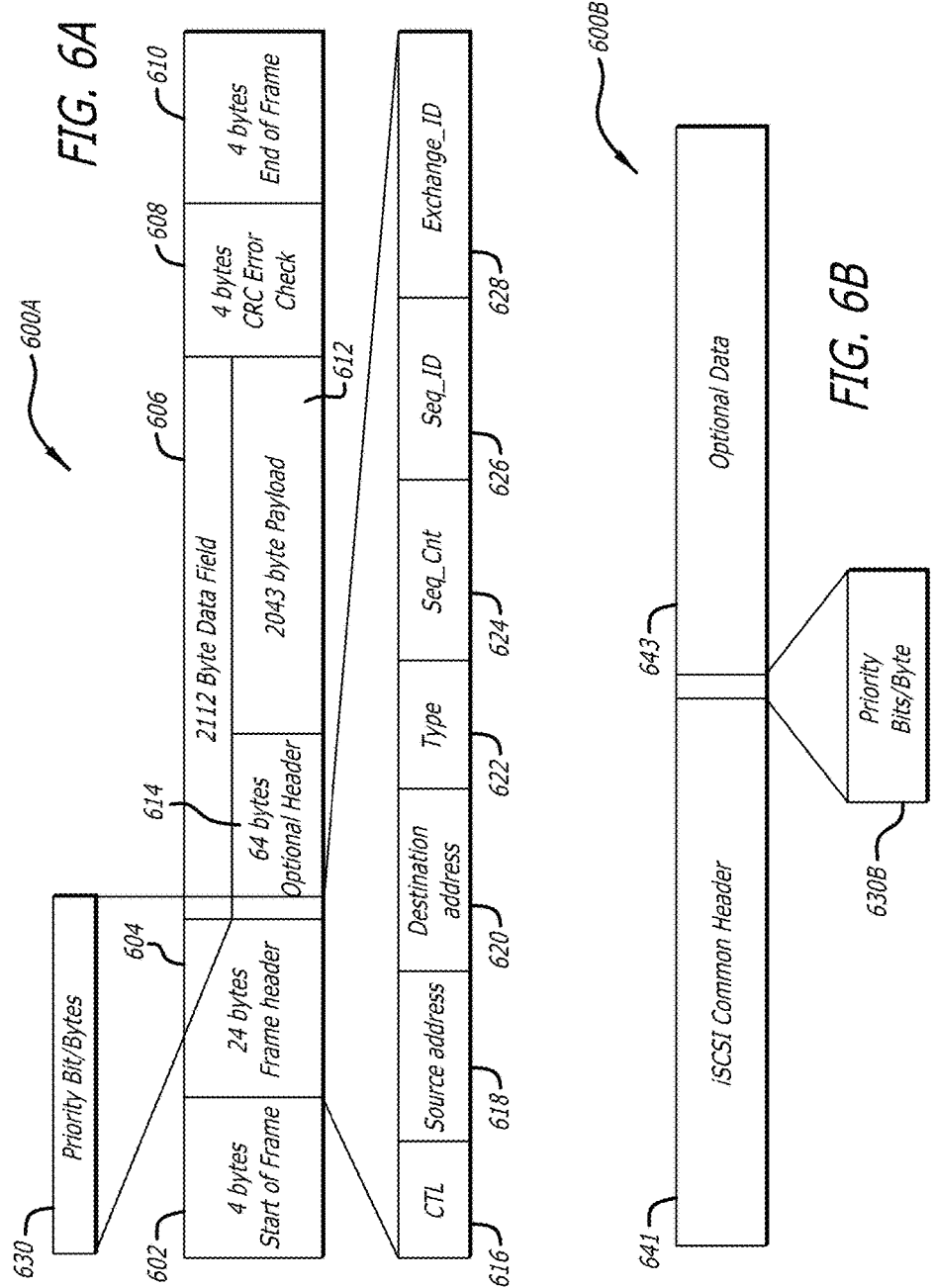

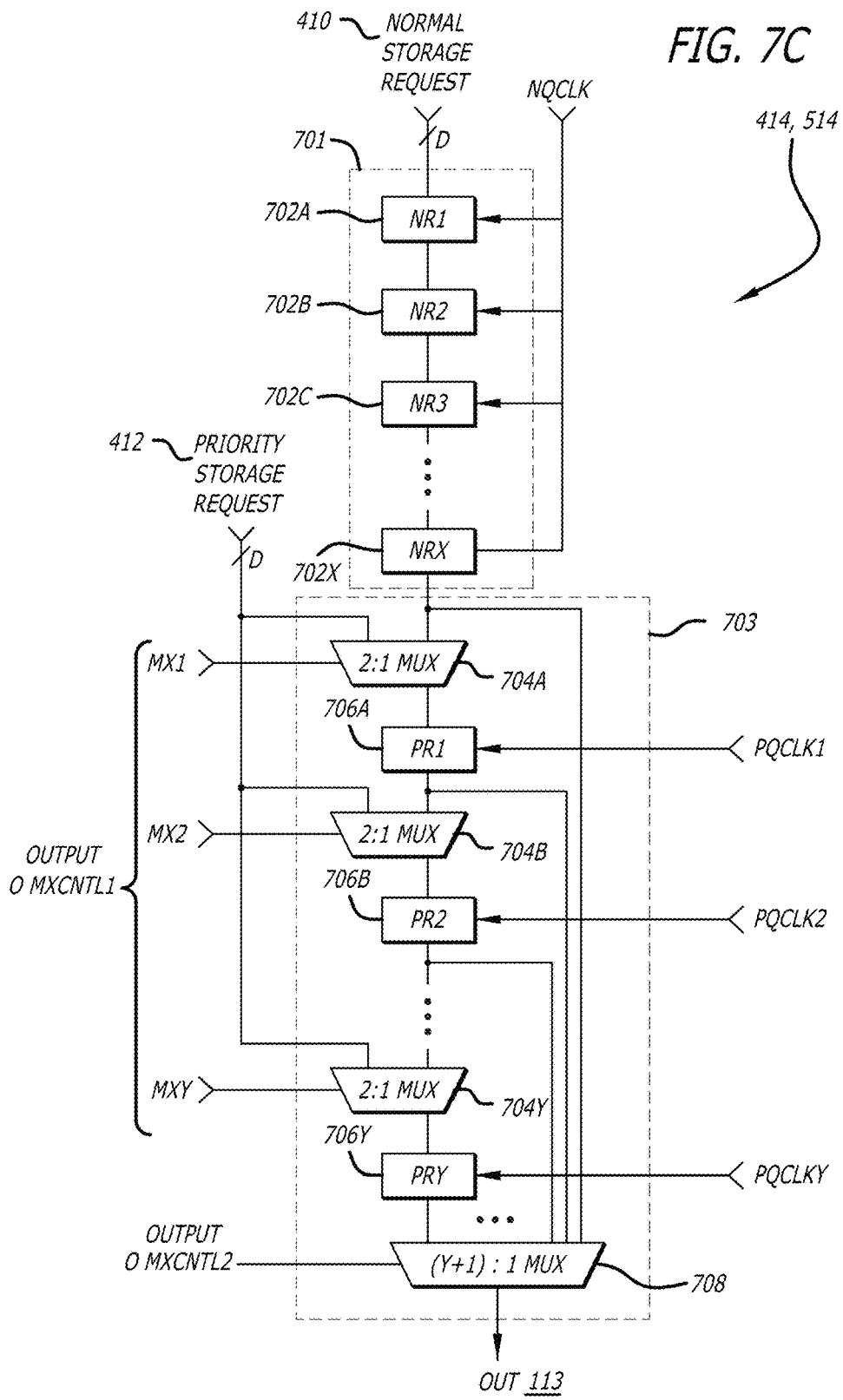

PRIORITY QUEUEING FOR LOW LATENCY STORAGE NETWORKS

CROSS REFERENCE TO RELATED APPLICATION

This patent application claims the benefit of U.S. Provisional Patent Application No. 61/880,919 filed on Sep. 21, 2013 by inventor Mark Karnowski, entitled PRIORITY QUEUEING FOR FLASH-BASED STORAGE NETWORKS, which is incorporated herein by reference.

FIELD

The embodiments of the invention generally relate to storage networks in a data center having flash memory based networked storage devices.

BACKGROUND

Computer networks have become specialized in the storage of data and are often referred to as a storage network or storage area network (SAN). These storage networks have been historically built around a magnetic rotating platter often referred to as a hard disk. The network storage devices in these historical storage networks consists of arrays of a plurality of hard disks with sophisticated controllers that provide enhanced data access services. These controllers create Logical Units (LUNs), comprised of hard disks or portions of hard disks. The controller then presents the LUNs to servers on the network for use as networked storage devices.

A fundamental aspect of this arrangement is based on the dependence on rotational media. When retrieving data from such a device, a processor waits until the platter rotates to the position where it't start reading. The access latency for a single read operation on a hard drive is a random value that is a function of the physical location of the data on the platter.

The effects of this can be mitigated for sequential data, with its predictable pattern of the next read operation. Placing written data on sequential sectors of the disk of a hard drive, ensures that read operations occur with minimal rotational latency. However, a large portion of real-world data access is random in nature. The next read operation of non-sequential data is difficult to predict.

Storage area networks have been formed taking into consideration the latency of hard disk drives and the random nature of read and write operations. Numerous input/output storage requests are handled by such storage area networks.

It is desirable to improve data access to storage area networks.

BRIEF SUMMARY

The embodiments of the invention are summarized by the claims that follow below.

BRIEF DESCRIPTIONS OF THE DRAWINGS

Embodiments of the invention will be described with reference to the Figures, in which reference numerals denote like elements and in which:

FIG. 2A illustrates a functional block diagram of a tiered storage array unit with Fibre Channel cards.

FIG. 2B illustrates a functional block diagram of a hard-drive storage array unit with Fibre Channel cards.

FIG. 2C illustrates a functional block diagram of a flash appliance with Fibre Channel cards.

FIG. 2D illustrates a functional block diagram of a tiered storage array unit with Ethernet cards.

FIG. 2E illustrates a functional block diagram of a hard-drive storage array unit with Ethernet cards.

FIG. 2F illustrates a functional block diagram of a flash appliance with Ethernet cards and Fibre Channel cards.

FIG. 6A illustrates a diagram of a Fibre Channel frame with a priority field to provide a priority indication of normal priority or high priority for a storage request.

FIG. 6B illustrates a diagram of an iSCSI message with a priority field to provide a priority indication of normal priority or high priority for a storage request.

FIG. 7C illustrates a functional block diagram of an example implementation of a port output queue.

DETAILED DESCRIPTION

Figure 1A:
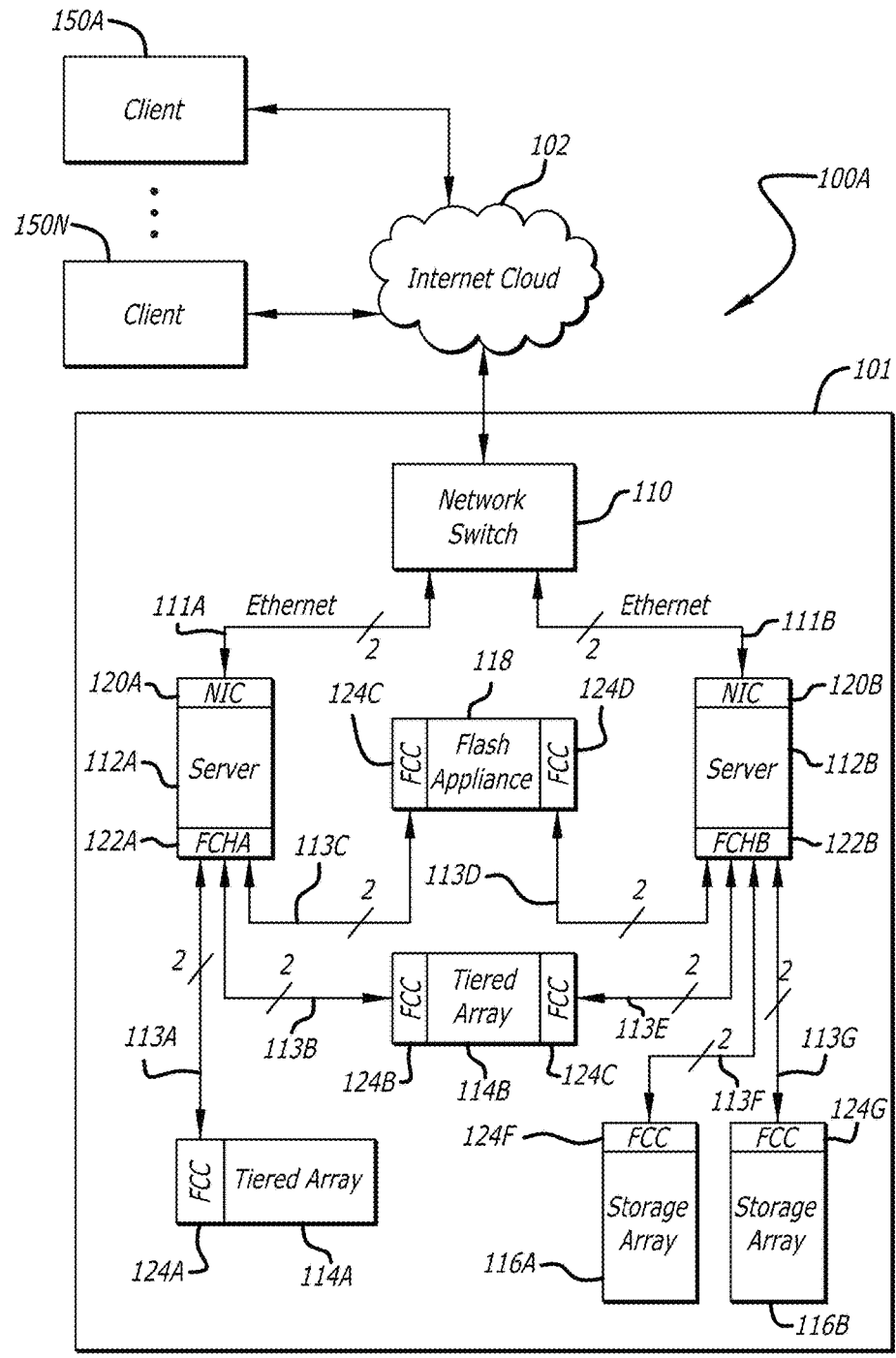
FIGS. 1A-1B illustrate functional block diagrams of a portion of a data center configured for Fibre Channel connectivity or Ethernet connectivity.

In the following detailed description, numerous specific details are set forth in order to provide a thorough understanding of various embodiments. However, it will be obvious to one skilled in the art that the embodiments may be practiced without these specific details. In other instances well known methods, procedures, components, and circuits have not been described in detail so as not to unnecessarily obscure aspects of the embodiments.

The embodiments include a method, apparatus and system for optimizations developed to provide better SAN functionality in local storage networks that include flash memory type of storage networking devices. Such flash memory type of storage networking devices include server resident flash memory caching, flash-equipped storage arrays, and flash based caching appliances. The embodiments of the invention provide improved functions in a storage network that includes flash memory type of storage devices.

One aspect of the embodiments that optimizes a storage network is priority queuing. Priority queuing is a mechanism that is targeted at flash based storage arrays or tiered storage arrays having flash based logical units (LUNs). Flash based logical units beneficially do not require an average seek time that rotating magnetic media does (typically a number of milliseconds), and thereby can achieve lower access latency. The priority queuing model segregates the traffic of instructions, commands for storage requests (referred to as storage requests) by logical unit (LUN), into normal priority storage requests (e.g., non-priority or low priority storage requests) and high priority storage request to ensure end-to-end prioritization of the traffic of flash based storage requests in a storage network. Priority queuing adds priority queuing software drivers to the operating system software of each host server (initiator) and each storage networking device (target) in a local storage network. Priority queuing further improves the hardware with modifications to the host adapter card in each host server and the target adapter card in each storage networking device.

The embodiments relate to optimizations developed to provide better storage area network (SAN) functionally in storage area networks that include flash memory type of storage devices. More particularly, the embodiments of the invention relate to improved functionality in a storage network that include flash memory based networked devices.

Other aspects of some embodiments of the invention provide various offload functionality in a storage array networking (SAN) end-point device to provide improved function in a storage network that contains flash memory based networked storage devices.

Although solid state drives (SSDs) address many of the problems with magnetic hard disks in traditional storage networks, flash memory technology is still more expensive on a per-bit basis than magnetic media, and it cannot entirely replace random access memory (RAM) for cache purposes. Therefore, storage devices with flash memory technology have been deployed according to several use cases:

Networked storage arrays have been designed to incorporate flash-based devices, such as solid state storage drives (SSDs), and are therefore able to present flash-based logical units (LUNs) of storage capacity to the local storage network. Some storage arrays employ only flash such as a flash storage appliance. Some networked storage arrays support multiple types of storage media combining flashed based SSDs and magnetic storage devices, for example, to provide logical units of storage capacity for each type of storage media forming a tiered storage array. With a tiered storage model of a tiered storage array, flash-based LUNs may be used for the many data types where minimizing access latency is critical, and rotational magnetic or optical media and their associated LUNs are used for bulk storage. A tiered storage array with the different types of LUNs, allows IT storage administrators to make appropriate cost and performance tradeoffs as they design their storage networking systems.

A second use for flash memory in network storage arrays involves the use of flash-based memory devices within a server to cache I/O requests. Since the cost per bit of flash memory is much lower in costs than random access memory (RAM). Accordingly, larger amounts of flash memory can be used to form flash based cache memory arrays in a server to store in cache large amounts of data in the flash cache memory array. Larger flash based cache memory arrays can reduce access times to critical and frequently-used data thereby significantly enhancing the performance of software applications executed by a server. This use case employs a Caching Filter Driver that resides in the Server's Operating System I/O Stack, with the ability to intercept write data requests, and if deemed appropriate by the filter driver's caching algorithm, write a copy of the data to the local flash-based cache. When the same data is read by the Server, the algorithm pulls the data from its cache instead of the external storage, realizing a significant performance benefit.

A third use case is similar to the caching function in the second use case above, but with the flash-based devices of several servers aggregated into a network device, such as a storage appliance. This provides a similar function, but with inherently better support for a centralized management scheme, which is generally desirable for network deployments. The fundamental functional difference for this third use case is that the act of writing data to the cache is carried out over the network, as opposed to a local operation.

Priority Queuing

A priority queuing feature allows for high priority storage requests to take precedent over normal priority storage requests in the storage arrays and storage appliances for the different type of storages arrays in a tiered storage array that may include flash-based storage and rotating media storage, for example. The priority queuing feature provides a method whereby operations targeting flash-based LUNs are sent with high priority, and employ special routing mechanisms to avoid being stuck behind I/O requests targeted at slower rotating media. The priority queuing feature provides an end-to-end solution to ensure optimized handling of flash traffic in a server, a storage array, and intervening network devices.

Referring now to FIG. 1A, a block diagram of a data center computer network 100A is illustrated. The data center computer network 100A can include a network switch 110, one or more servers 112A-112B, one or more tiered storage appliances 114A-114B, one or more storage array appliances 116A-116B, and one or more flash appliances 118 coupled together as shown forming a local storage area network (LAN) 101. One or more clients 150A-150N may interface with the data center computer network 100A over a wide area network 102, such as the internet 102. The one or more clients 150A-150B may desire one or more server functions of the servers 112A-112B for software applications and/or storage capacity provided by the storage arrays or appliances 114A-114B, 116A-116B,118 to store data.

The network switch 110 in the data center is coupled to the wide area network (WAN) 102 such as the internet or world wide web. This allows data to be communicated between the servers/storage arrays in the data center 100A and the one or more remotely located clients 150A-150N over the WAN 102.

A pair of servers 112A-112B, also referred to as storage initiators, are coupled to the network switch 110 via Ethernet cables 111A-111B terminating in Ethernet cards 120A-120B installed on servers 112A-112B. The servers 112A-112B further have Fibre Channel host adapter cards 122A-122B respectively installed.

In one embodiment, a target network device (also referred to herein as a storage target) includes a pair of Fibre Channel cards 124A-124B installed to receive signals, including a storage request, from the servers 112A-112B via wires or cables, such as Fibre Channel cables 113C-113D. The target network device may be one of the tiered storage arrays 114A-114B, the storage arrays 116A-116B, or the flash appliance 118 (referred to collectively as storage array appliances). Fibre Channel cards 124A, 124B, 124E, 124F, and 124G may be installed in the storage array appliances 114A, 114B, 116A-116B and 118.

The servers 112A-112B have Fibre Channel host adapters 122A-122B that are coupled to the Fibre Channel cards in the storage array appliances 114A-114B, 116A-116B and 118. The Fibre Channel host adapters differ somewhat from the Fibre Channel cards because the server is an initiator and the storage array appliances are targets.

In some embodiments, the couplings between servers 112A-112B and the storage array appliances are via Fibre Channel cables 113A, 113B, 113E, 113F and 113G that terminate at one end at the Fibre Channel cards 124A, 124B, 124E, 124F, and 124G of the storage array appliances 114A, 114B, 116A and 116B.

Figure 1B:
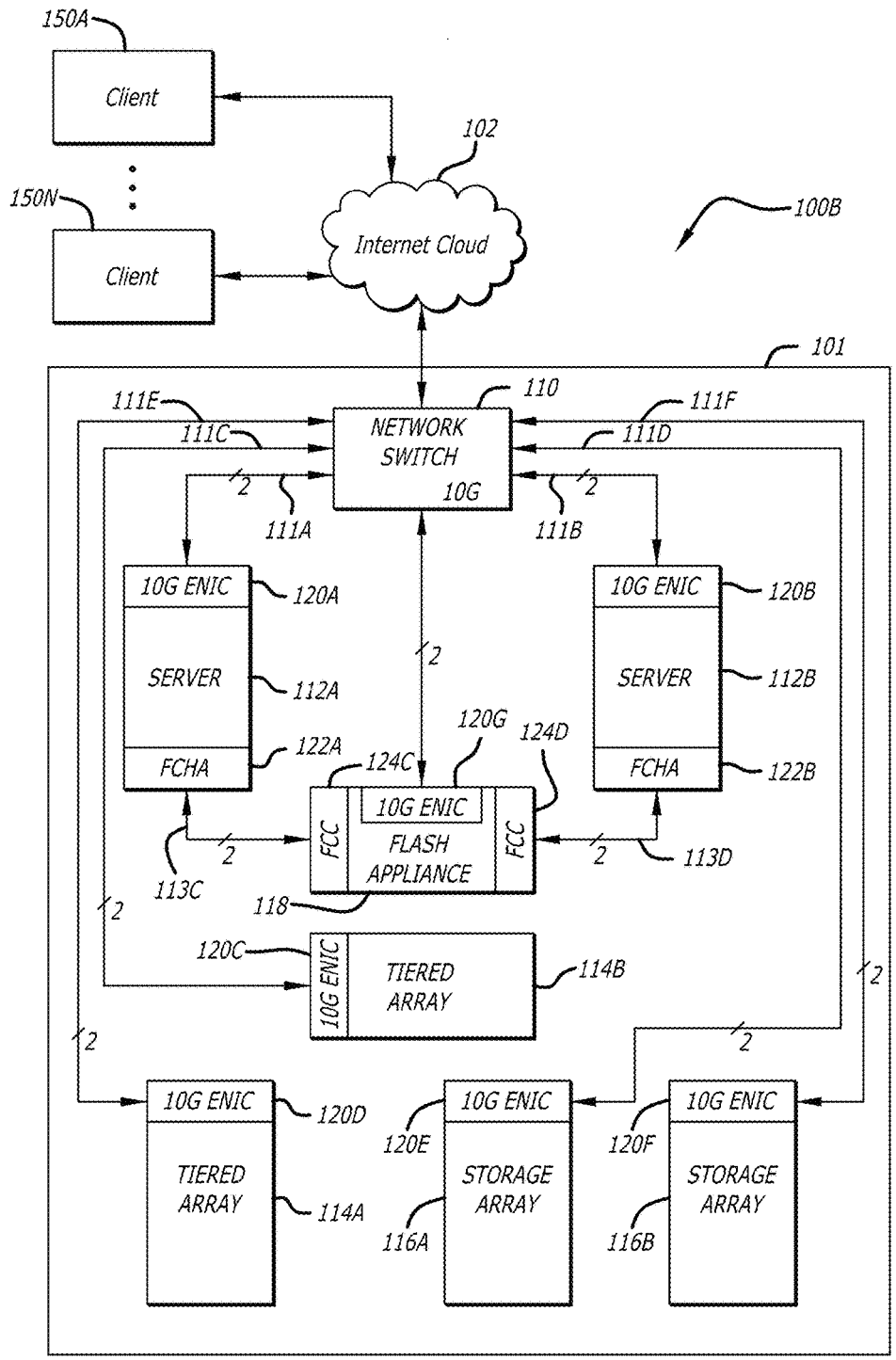

Referring now to FIG. 1B, a functional block diagram of a data center computer network 100B is illustrated having a number of Ethernet cable connections to support Fibre Channel over Ethernet communication protocol. The data center computer network 100B can include a network switch 110, one or more servers' 112A-112B, one or more tiered storage appliances 114A-114B, one or more storage array appliances 116A-116B, and one or more flash appliances 118 coupled together as shown forming a local area network (LAN) 101.

The network switch 110 is coupled to a wide area network (WAN) 102 such as the internet or World Wide Web. This allows data to be communicated between the servers in the data center 100B and remotely located clients (not shown) over the WAN 102.

A pair of servers 112A-112B, also referred to herein as storage initiators, are coupled to the network switch 110 via Ethernet cables 111A-111B terminating in Ethernet cards 120A-120B installed on servers 112A-112B. The servers 112A-112B further have Fibre Channel host adapter cards 122A-122B respectively installed into them. The Fibre Channel host adapters 122A-122B installed in servers 112A-112B differ somewhat from the Fibre Channel cards 124C-124D because the server is an initiator and the storage array appliances are targets. In some embodiments, a flash appliance device 118 includes a pair of Fibre Channel cards 124C-124D installed to receive signals, including a storage request, from the servers 112A-112B via wires or cables, such as Fibre Channel cables 113C-113D. The target network device may be one of the tiered storage arrays 114A-114B, the storage arrays 116A-116B, or the flash appliance 118 (referred to collectively as storage array appliances). Ethernet cards 120A-120G may be installed in the storage array appliances 114A, 114B, 116A, 116B and 118 to receive signals, including storage requests, from the servers 112A-112B via wires or cables, such as Ethernet cables 111C-111F terminating in Ethernet cards 120A-120F.

One of ordinary skill in the art will recognize that the Fibre Channel host adapters and Fibre Channel cards can support Fibre Channel over Ethernet (FCOE) as well as other communication protocols over either copper and/or optical cables. One of ordinary skill in the art will also recognize that aspects of the invention may be extended to high-speed wireless communication protocols between pairs of wireless receivers/transmitters.

Priority Storage Requests and Logical Units of Storage Capacity

Referring now to FIG. 2A, a block diagram of a tiered storage array unit 114 representing the tiered storage arrays 114A-114B is illustrated. Each tiered storage array unit 114 includes one or more Fibre Channel cards (FCC) 124 installed that employ aspects of the invention to receive and send signals, including normal priority storage requests (e.g., non-priority storage requests) and high priority storage requests via wires and/or cables interconnecting the local storage area network.

Each tiered storage array unit 114 further includes flash memory storage devices FM1-FMN to provide a portion of its storage capacity. Each tiered storage array unit 114 further includes at least one different type of storage media, such one or more hard disk drives HD1-HDN and/or one or more writeable optical disks OD1-ODN.

The storage capacity in a storage array may be logically assigned based on the type of media and/or the type of storage service that is desired for a given function or application. For example, logical unit 1 (LUN 1) is uniformly assigned to a plurality of flash memory storage devices FM1-FM5. Logical unit X (LUN X) may be uniformly assigned to one or more hard disk storage devices HDN. Logical unit Z (LUN Z) may be uniformly assigned to one or more optical disk storage devices ODN. Logical unit M (LUN M) may be assigned to flash memory storage FMN-FML. Logical unit Y (LUN Y) may be assigned to optical disk storage OD1-OD2. Storage capacity in a given storage media may also be split up to a plurality of LUNs. For example in FIG. 2A, hard disk storage device HD1 has its capacity split up to support LUN R, LUN S, and LUN T.

According to one aspect, the storage requests include a higher priority indication or a normal priority indication as to whether or not a high or higher priority storage request has been made that is to be treated with higher priority than a normal priority storage request. The type of storage requests may be given to functions based on the expected storage service provided and the underlying media providing such storage capacity. For example, LUN 1 having the plurality of flash memory storage devices FM1-FM5 may be assigned to functions and applications that expect a fast storage performance in comparison with the LUN X, for example. In this case, storage requests may be high priority storage requests to match the faster storage service provided by the flash memory storage devices FM1-FM5. LUN X and LUN Z have slower storage devices assigned to them such that storage requests may be normal priority storage requests to match the slower storage service provided by the hard disk and optical disk storage devices.

Referring now to FIG. 2B, a block diagram of an exemplary hard-drive storage array unit 116 represents the storage arrays 116A-116B of FIG. 1A and FIG. 1B. Each hard-drive storage array unit 116 of FIG. 2B includes one or more Fibre Channel cards (FCC) 124 installed to receive and send signals, including normal priority storage requests and high priority storage requests, via wires and cables of the local storage area network.

The hard-drive storage array unit 116 may include a uniform media type, such as a plurality of hard disk drives HD1-HDN. The storage array unit may include alternatively a plurality of optical disk drives OD1-ODn, for example. The storage capacity in the storage array 116 may be logically assigned based on the desired capacity for a given function or application. For example, logical unit 1 (LUN 1) may be assigned to portions of a first hard drive HD1. Logical unit 2 (LUN 2) may be assigned to the entire capacity of the third hard drive HD3. Logical unit M (LUN M) may be assigned to a plurality of hard drives HDM-HDN.

Traditional hard drives are typically slower to execute storage requests than flash memory devices. Accordingly, the storage requests that the storage array unit 116 may be expected to receive are normal priority storage requests to match the slower storage service provided by the hard disk drives or optical disk storage devices. However, improvements in hard drives, such as faster rotational speeds, or hybridization by adding flash memory to a hard disk drive can improve the storage performance so that a faster storage service performance is provided. In this case, the storage array unit with such improved performance hard drives may be expected to receive high priority storage requests.

FIG. 2C illustrates a flash appliance 118 with one or more Fibre Channel cards (FCC) 124. The Fibre Channel cards (FCC) 124 can prioritize signals, including high priority storage requests and normal priority storage requests, sent or received from the initiators (servers) and the targets (storage array appliances) into their respective priority queue or normal queue for delivery schedule management. The flash appliance 118 further includes a plurality of flash memory storage devices FM1-FMN to provide a fast storage array.

The storage capacity in in the flash memory appliance 118 may be logically assigned based on the amount of storage capacity and storage service that is desired for a given function or application. For example, logical unit 1 (LUN 1) is uniformly assigned to a plurality of flash memory storage devices FM1-FM2. Logical unit N (LUN N) may be assigned to one flash memory storage device FMN. Other logical units may be assigned to a fraction of a flash memory storage device, or to a whole and/or plurality, as needed.

With the flash appliance 118 having nothing but faster flash memory storage devices, the expected storage requests that the flash applicant may receive are high priority storage requests. However, if a function assigned to a LUN in the flash appliance only needs normal priority, that LUN may be expected to receive normal priority storage requests, even though its storage devices are faster than hard disk drives or optical disk storage devices.

FIGS. 2D, 2E, and 2F illustrate similar networked devices to those illustrated respectively in FIGS. 2A, 2B, and 2C but with high speed Ethernet network interface cards 120 in place of or in addition to Fibre Channel cards 124. In this case, the storage network e.g. (101 of FIGS. 1A and 1B) supports a Fibre Channel over Ethernet (FCoE) protocol and the network storage devices 114A-114B, 116A-116B, and 118 can directly couple to the network switch 110 as shown in FIG. 1B.

FIG. 2D illustrates a tiered storage array unit 114' with one or more high speed (e.g., 10 GB) Ethernet cards ENIC 120 installed to receive and send signals, including storage requests over wire and cables, from the local storage network 101 of FIG. 1A and FIG. 1B. FIG. 2E illustrates a hard-drive storage array unit 116' with one or more high speed Ethernet cards 120 installed to receive and send signals, including storage requests via wires and cables, from the local storage network. FIG. 2F illustrates a flash appliance 118' with one or more Fibre Channel cards 124 and/or one or more high speed Ethernet cards 120 advantageously enabled to prioritize the signals, including storage requests, sent or received from the initiators (servers) and the targets (storage array appliances) into their respective priority queue or normal queue for delivery schedule management. The logical units may be similarly defined as described previously with reference to FIGS. 2A-2C.

Figure 2G:
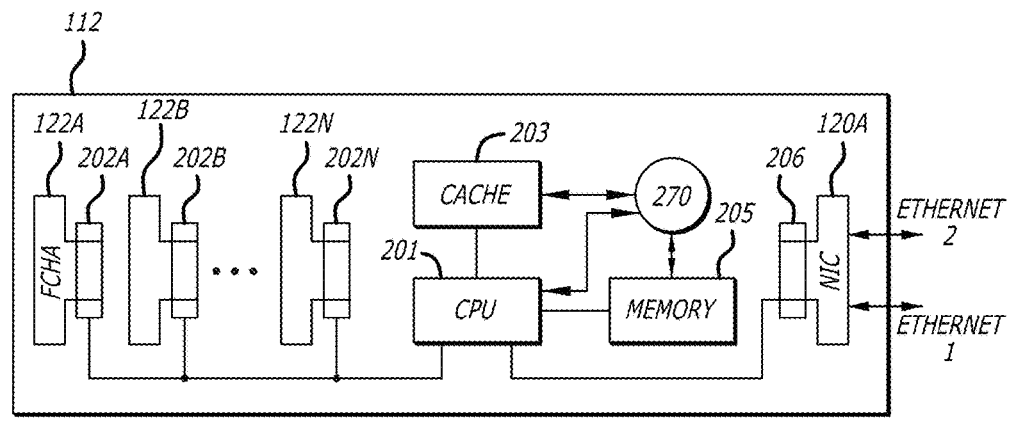
FIG. 2G is a functional block diagram of a server with Fibre Channel and Ethernet adapter cards for data communication over various types of interfaces.

Referring now to FIG. 2G, a block diagram of a server 112 that is exemplary of the servers 112A-112B is illustrated. Each server 112 includes one or more Fibre Channel host adapters (FCHA) 122A-122N operatively coupled with sockets 202A-202N and a high speed Ethernet card 120 operatively coupled with socket 206 for data communications over various types of interfaces with various communication protocols. The high speed Ethernet card 120, for example, may communicate with networked storage devices using a Fibre Channel over Ethernet (FCoE) communication protocol, or another protocol. The one or more Fibre Channel host adapters (FCHA) 122A-122N may communicate with networked storage devices using a Fibre Channel (FC) communication protocol, such as small computer system interface (SCSI). Each server 112 further includes one or more processors 201, a cache memory 203, and scratch pad memory 205 coupled together as shown. Each server 112 may further include another larger storage device 270, such as a hard disk drive or a solid state storage drive (SSD) to store software instructions of software drivers and software applications for execution by the one or more processors to perform various functions described herein. The one or more processors 201 may be multi-processors having multiple processor cores in one package that can be assigned to certain server functions. A portion of the cache memory 203 may be allocated and assigned to each processor 201 for use. The cache memory 203 may be a flash based cache memory (FBC) that is non-volatile to retain is data in the event of power down or a catastrophic power failure.

Figure 2H:
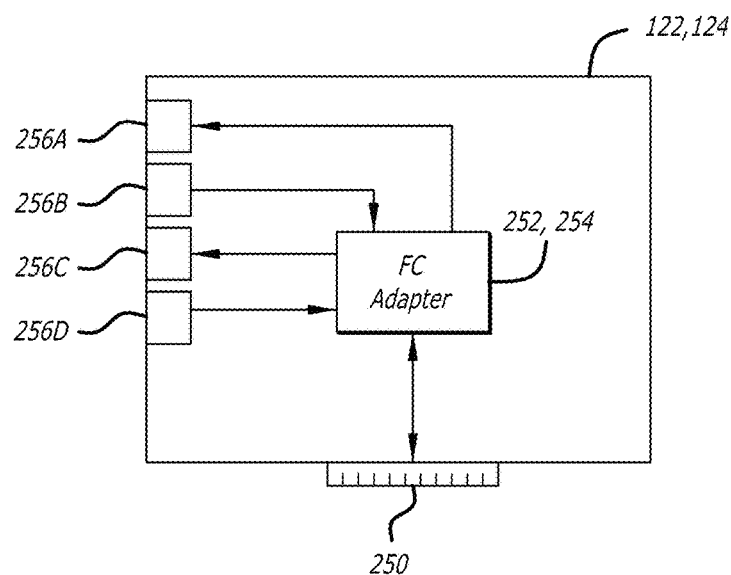
FIG. 2H illustrates a functional block diagram of an adapter card with an adapter integrated circuit.

Referring now to FIG. 2H, a functional block diagram of an adapter card 122, 124 is shown. The adapter card 122,124 may be a Fibre Channel host adapter of a server 122, also referred to as an initiator of storage requests. The adapter card 122,124 may be a Fibre Channel card of a networked storage device, also referred to as a target. In either case, the adapter card 122,124 includes a Fibre Channel (FC) module 252,254 that can prioritize storage requests. The Fibre Channel module 252,254 can be an integrated circuit. The Fibre Channel module 252,254 is coupled between the bus connector 250, such as a PCI or PCIe connector, and a plurality of cable connectors 256A-256D. The bus connector 250 is used to plug the adapter card into a socket of the server or the networked storage device. The cable connectors 256A-256D are used to couple to a wire cable or an optical cable so that the server or the networked storage device may communicate to each other within the local storage network 101 or to clients over a wide area network 102.

Figure 2I:
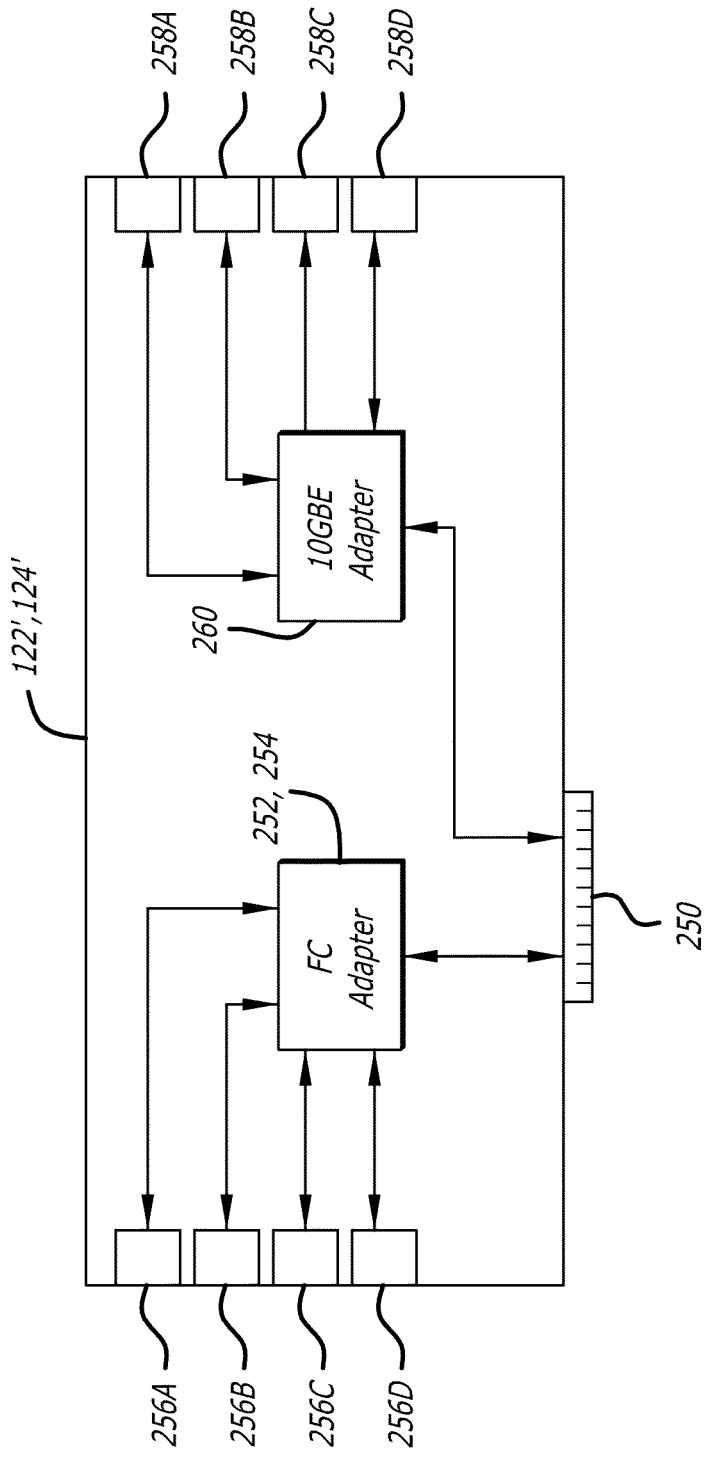
FIG. 2I illustrates a functional block diagram of an adapter card with adapter integrated circuits employing aspects of the embodiments for communication over Fibre Channel or Ethernet.

Referring now to FIG. 2I, a functional block diagram of an alternate embodiment of an adapter card 122',124' is shown. Similar to the adapter card 122,124, the adapter card 122',124' includes a Fibre Channel adapter 252,254 coupled between cable connectors 256A-256D and the bus connector 250. The adapter card 122',124' may further include an Ethernet adapter 260 coupled between the bus connector 250 and Ethernet connectors 258A-258D to communicate with a Fibre Channel over Ethernet (FCoE) protocol using a high speed Ethernet physical interface. One of ordinary skill in the art will recognized that other protocols may be used to communicate high and normal priority storage requests over cables between adapter cards and network equipment. If the high speed Ethernet physical interface is all that is needed, the Fibre Channel adapter circuit 252,254 and the cable connectors 256A-256D may be eliminated from the adapter card. The bus connector 250 is used to plug the adapter card 122' or 124' into a socket of the server or the networked storage device. The cable connectors 256A-256D and/or Ethernet connectors 258A-258D are used to couple to a wire cable or an optical cable so that the server or the networked storage device may communicate to each other within the local storage network 101 or to clients over a wide area network 102.

According to one aspect, the Fibre Channel adapter 252, 254 and/or Ethernet adapter 260 are implemented as integrated circuits and the high priority storage requests and the normal priority storage requests are communicated by servers and the networked storage devices over the wires or cables in the local storage network 101 coupled to the adapter cards 122, 124 through the adapter integrated circuits 252,254 and/or 260.

Figure 3:
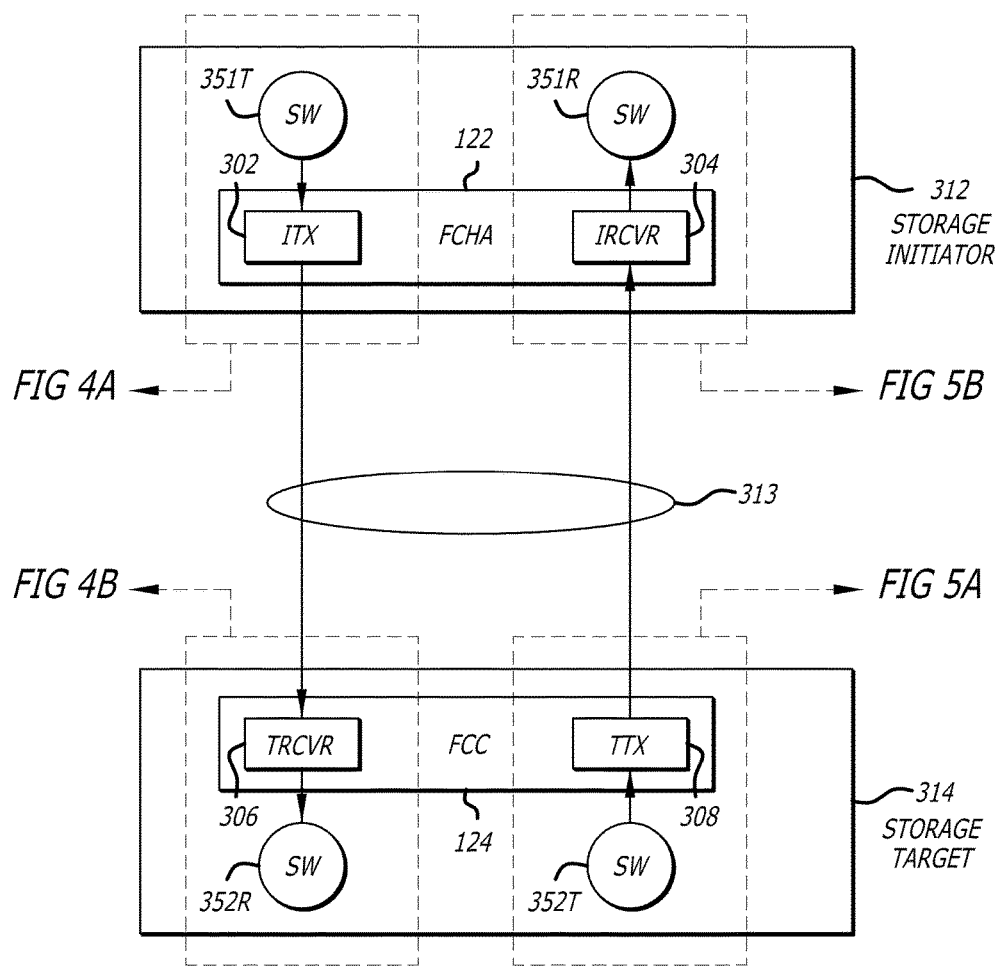
FIG. 3 illustrates a functional block diagram of the interface between a storage initiator (such as a server) and a storage target (such as a storage array) for the transmission and reception of storage requests and acknowledgements.

Priority Storage Requests and Priority Acknowledgments Communicated Between Networked Devices FIG. 3, illustrates a communication interface over wires or cables 313 between a networked storage initiator 312 (such as a server 112 of FIG. 1A and FIG. 1B) and a networked storage target 314 (such as a storage array 114, 116, 118). The storage initiator 312 is configured with a Fibre Channel host adapter card (FCHA) 122 as well as transmit software driver 351T and receive software driver 351R. The networked storage target 314 is configured with a Fibre Channel adapter card (FCC) 124 as well as a transmit software driver 352T and a receive software driver 352R.

The Fibre Channel host adapter (FCHA) card 122 for the initiator 312 includes the adapter integrated circuit 252 e.g. (FIGS. 2H-2I). The adapter integrated circuit 252 includes an initiator transmit module (ITX) 302 and an initiator receive module (IRCVR) 304. The initiator transmit module 302 is provided to send signals, including high priority storage requests and normal priority storage requests, out over the network over the wires or cables 313. The initiator receive module 304 is provided to receive return signals, including high priority storage requests and normal priority storage requests, from the network (e.g. 101) over the wires or cables 313.

The Fibre Channel adapter card 124 for the target 314 includes the adapter integrated circuit 254 (e.g. FIGS. 2H-2I). The adapter integrated circuit 254 includes a target receive circuit 306 and a target transmit circuit 308. The target receive circuit 306 is provided to receive signals, including the high priority storage request and normal priority storage requests, from the initiator 312 over the network of wires or cables 313. The target transmit circuit 302 is provided to send signals, including responses to the high priority storage requests and normal priority storage requests, out over the network through the wires or cables 313 to the initiator 312.

Signals, including storage requests, are initiated by and originate from the initiator 312. The storage target 314 receives the signals and acts upon them if they are for its logical units of storage capacity. The initiator 312 initiates Fibre Channel signals, including high priority storage requests and normal priority storage request, and transmits them to the storage target 314. The storage target 314 receives the Fibre Channel signals and acts on those that are directed to its logical units. In response to receiving a storage request directed to one or more of its logical units, the storage target 314 executes the storage request whether it is to store data or to read data from its logical units of storage capacity. After execution, the storage target 314 then transmits a Fibre Channel signal, including a high priority acknowledgment or normal priority acknowledgement, to the initiator 312 acknowledging with or without data (depending upon a read or write) that the storage request was executed and completed. If the storage request was a high priority storage request, the acknowledgement and data, if any, are likewise returned with a high priority indication. If the storage request was a normal priority storage request, the acknowledgement and data, if any, are likewise returned to the initiator by the storage target with a normal priority indication.

To distinguish normal priority storage requests from high priority storage requests, a priority indicator is set in a given network communication protocol to communicate I/O high priority storage requests and I/O high priority acknowledgements through the local storage network. An I/O high priority storage request traverses the storage network with high priority in comparison with normal priority storage requests. In one embodiment, Fibre Channel frames are used to communicate storage requests and acknowledgments. Various digital signal communication protocols may be used to form storage requests (high priority storage request signals and normal priority storage request signals) with a priority indicator for communication within the local storage network between storage initiator and storage target, such as internet small computer system interface (iSCSI), ATA-over-Ethernet (AoE), Fibre Channel over Ethernet (FCoE), Fibre Channel over IP (FCIP), HyperSCSI SCSI over Ethernet frames instead of IP, ISCSI Extensions for RDMA (iSER), Internet Fibre Channel Protocol (iFCP), Internet Storage Name Service (iSNS).

Referring now momentarily to FIG. 6A, a diagram of data fields in a Fibre Channel frame 600A of a Fibre Channel signal is illustrated. According to another aspect, the Fibre Channel frame 600 includes a priority field 630 of one or more bits or bytes to identify whether or not a storage request is a high priority storage request to be handled with high priority or a normal priority storage request to be handled with normal priority. If an acknowledgement, the priority field 630 indicates whether or not a acknowledgement is a high priority acknowledgement to be handled with high priority or a normal priority acknowledgement to be handled with normal priority. The priority field 630 may be a part of an optional header field 614 in the Fibre Channel frame 600.

The Fibre Channel frame 600A includes a start of frame field 602, a frame header field 604, a multi-byte data field 606, the optional header field 614, a multi-byte payload field 612, an error check field 608, and an end of frame field 610. The frame header field 604 includes a control field 616, a source address field 618, a destination address field 620, a type identifier field 622, a sequence control field 624, a sequence identifier field 626 and an exchange identifier field 628.

The multi-byte data field 606 may be a field of 2112 bytes. The multi-byte payload field 612 of the frame 600A is a 2048 bytes. The optional header field 614 may be formed of 64 bytes in the frame, one of which may include a priority bit or priority byte as the priority field 630. After the data fields, a cyclic redundancy check field 608 is provided in the frame 600. The cyclic redundancy check field 608 provides for error control checks and possible correction of an error that is found. The frame 600A further includes an end of frame designator 610 identifying its end.

Referring now momentarily to FIG. 6B, a diagram of data fields in an iSCSI message or protocol data unit (PDU) 600B of an iSCSI signal is illustrated. According to another aspect, the iSCSI message 600B includes a priority field 630B of one or more bits or bytes to identify whether or not a storage request is a high priority storage request to be handled with high priority or a normal priority storage request to be handled with normal priority. If an acknowledgement, the priority field 630B indicates whether or not an acknowledgement is a high priority acknowledgement to be handled with high priority or a normal acknowledgement to be handled with normal priority. The priority field 630B may be a part of an optional header field in the iSCSI message 600B. The priority field 630B may be set similar to the priority filed 630A to provide a priority indicator for either a high priority storage request or a normal priority storage request.

The iSCSI message 600B further includes an iSCSI control header 641 and an optional data field 643 as shown in FIG. 6B.

Figure 6C:
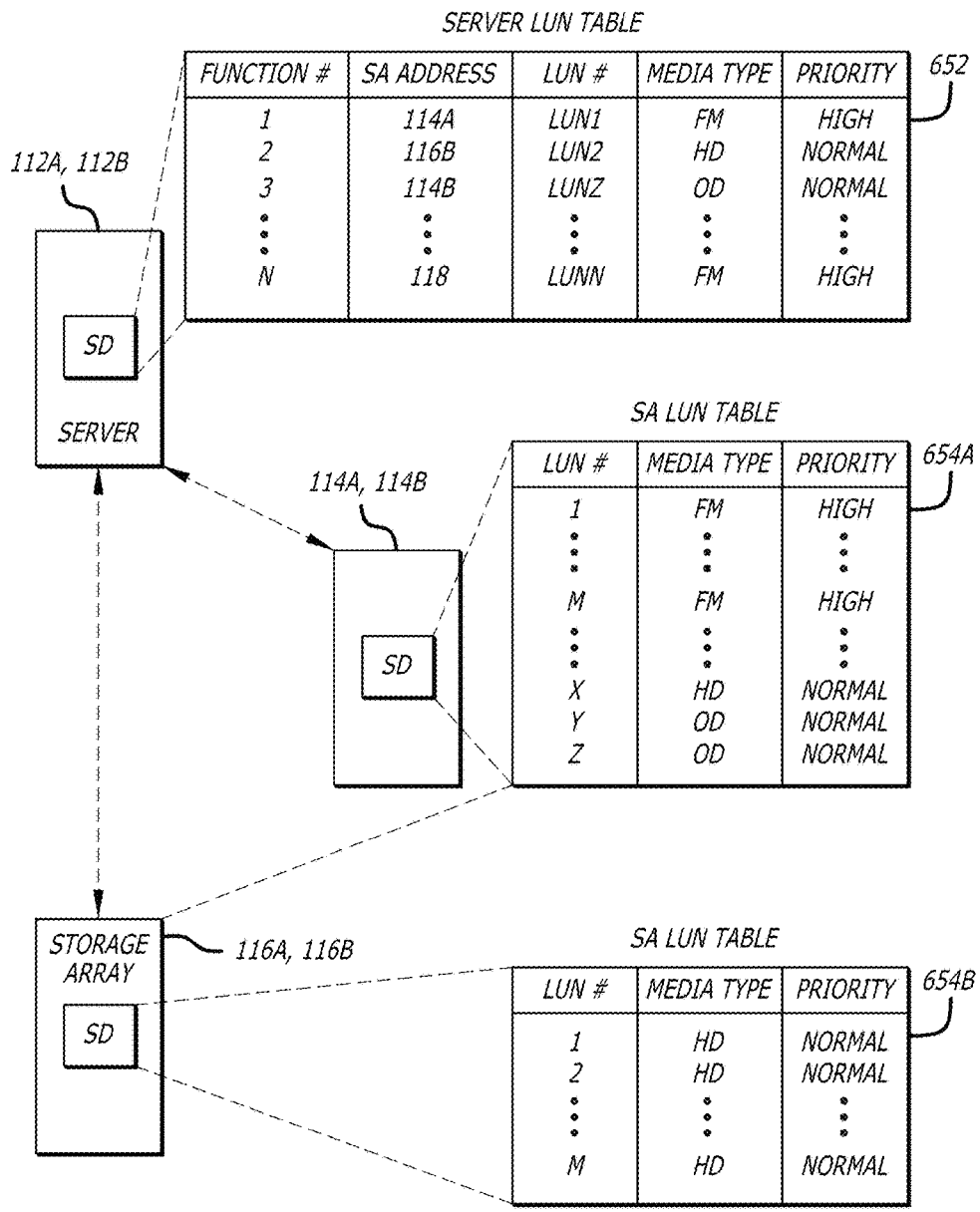
FIG. 6C illustrates a diagram of LUN tables for servers and storage arrays to identify high priority storage requests and normal priority storage requests based on the LUN number.

Referring now to FIG. 6C, instead of or in addition to a priority bit or byte in a frame or message, LUN tables may be tabulated and stored in a storage device SD within each server 112A,112B, and each storage array, 114A-114B, 116A-116B, 118 within the local storage network 101 of FIGS. 1A-1B. Server LUN table 652, for example, may be stored in a storage device (SD) in the server 112A-112B. Storage array LUN tables 654A-654B, for example, may be stored in a storage device (SD) in the storage arrays 114A-114B,116A-116B. The storage device may be a hardware device such as memory, a local hard drive, or a cache memory. Alternatively, the tables may be software based and stored in the server or storage array where a software driver can gain access.

The server LUN table 652 includes rows to identify the server function number with a storage array address and LUN number. In the same row, the media type and priority of a storage request can also be stored and/or associated with the given LUN number and storage array address that are assigned to the server function. For example, server function 1 is assigned LUN 1 in the storage array associated with storage array (SA) address 114A. The LUN 1 in the storage array with address 114A has a flash memory media type and a high priority storage request. Thus, the server 112A, 112B knows that storage requests to this LUN in this storage array are treated as high priority storage requests.

To complement the server LUN table 652, each storage array in the local storage network also stores a storage array (SA) LUN table 654A-654B. The SA LUN table 654A-654B includes rows to identify the LUN numbers assigned to the media type therein and the priority of a storage requests that are expected for the given LUN number. The LUN numbers identify the assigned storage capacity within the storage device and the addresses therein where data can be stored. In table 654A for example, LUN 1 in the storage array 114A,114B is associated with a flash memory media type and is expected to receive high priority storage requests. LUN Z on the other hand is associated with an optical disk (OD) media type and is expected to receive normal priority storage requests.

With server LUN tables and storage array LUN tables stored in the networked devices in a local storage network representing the available storage capacity therein, the hardware and software drivers in each can determine whether or not a storage request is a high priority storage request for fast media types, such as flash memory based storage, or a normal priority storage request for slower media types, such as hard disk drive based storage.

Figure 4A:
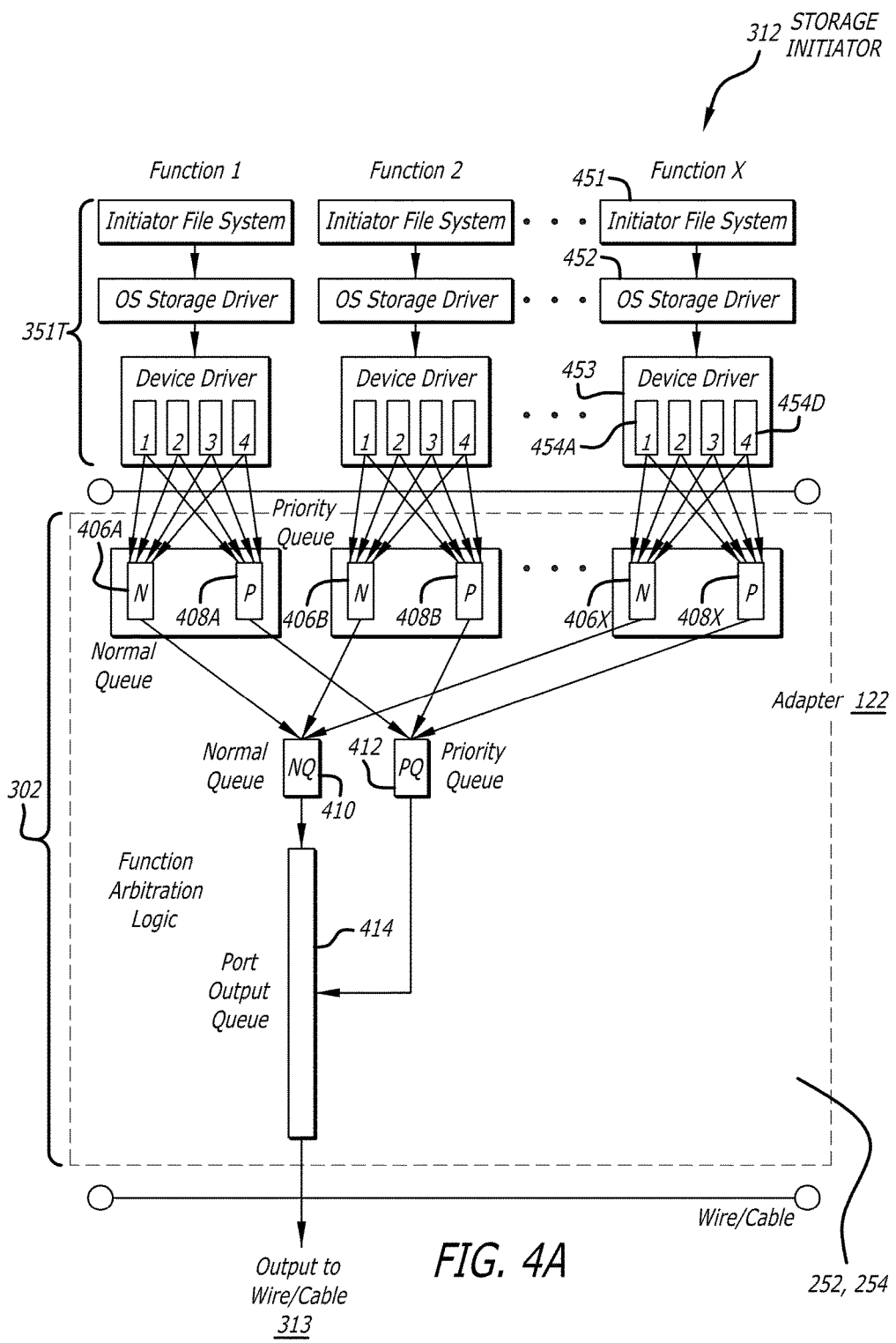
FIG. 4A illustrates a functional block diagram of the transmission of storage requests by the storage initiator onto the wire/cable of the storage area network.

Referring now to FIG. 4A, a functional block diagram of portions of the storage initiator 312, such as a server 112, are shown. Generally in the initiator 312 and the I/O adapter 122, I/O storage requests flow through a series of queues where they are held until they can be serviced. The queues are typically implemented with finite depths, such that congestion or delay in servicing the head of the queue can cause it to fill up. A queue that is full of storage requests creates back pressure on the queues above it. This back pressure condition is known as head of line blocking. Head of the line blocking can negatively impact the performance of a server due to increased access latency and lower transactions per second.

Previously, I/O storage requests for both flash-based media (also referred to as low latency media) and rotational media (also referred to as high latency media) traversed the same queue. Storage requests for rotational media with slower access times in front of flash based storage requests can create a head of line blocking situation. In a head of line blocking situation, flash based storage request in the same queue end up being blocked by rotational media based storage requests that are in front of the flash based storage requests. It is desirable to eliminate head of line blocking of storage requests for low latency media so that the benefits of low latency media (such as flash based storage) in a storage area network can be realized.

An advantageous solution is to provide pairs of parallel queues, normal priority queues in parallel with high priority queues, at various communication layers of the network communication paths to ensure that flash-based I/O storage requests are not subjected to head of line blocking by rotational media I/O storage requests.

In FIG. 4A, the storage initiator 312, such as a host server 112 (e.g. of FIGS. 1A and 1B), may execute instructions with its processor to provide a plurality of peripheral component interconnect (PCI) functions, Function 1 through Function N. A function may be a virtual operating system, for example. For each function, the transmit software driver 351T provides a file system 451, an operating system storage driver 452, and a device driver 453.

The device driver 453 forms one or more LUN queues 454A-454D for the one or more LUNs that may be assigned to each given function of the server. Each LUN has its own queue to hold an order of a plurality of I/O storage requests. The device driver 453 has knowledge of the one or more LUNs that are assigned to the given function and thus its priority. For example, a LUN that is assigned to a flashed base storage device, e.g., LUN 1 in the tiered array 114 (e.g. of FIGS. 1A, 1B, 2A and 2D), have priority I/O storage requests (also referred to as high priority storage requests).

The device driver executed by a processor in the storage initiator further sets the priority indicator (e.g., prioritization bits or byte) or not, of each storage request as they are stored into the one or more LUN queues. Each of the one or more LUN queues 454A-454D may store one or more normal priority storage requests and one or more high priority storage requests. To properly handle each, the one or more normal priority storage requests and the one or more high priority storage requests are sorted out from the LUN queues 454A-454D by binning them into a normal work queue 406X and a priority work queue 408X for each function, Function 1, 2, . . . X. For each function, the device driver causes the normal work queue 406X and the priority work queue 408X to be formed in the transmit circuit of the adapter integrated circuit. The I/O priority (e.g. SSD) storage requests are directed from the LUN queues into the high priority queues. The I/O normal (e.g. HDD) storage requests are directed from the LUN queues into the normal queues.

Within the Fibre Channel host adapter 122, for each function, the initiator transmit module 302 includes normal work queues 406A-406X to store normal priority storage requests for transmission and priority work queues 408A-408X to store high priority storage requests for transmission. Accordingly, the normal work queues 406A-406X and the priority work queues 408A-408X are in communication with the LUN queues 454A-454D of each function to receive the high priority storage requests and the normal priority storage requests.

If a storage server or other networked storage device supports one function, there are fewer storage requests and the queuing model can be simplified. However most networked devices, such as a server, support multiple simultaneous PCI functions. Accordingly, the plurality of storage requests coming from the plurality of work queues need to be arbitrated by function arbitration logic. The priority and normal queuing model is thus carried into the function arbitration logic for the transmit circuit of the adapter circuit. Accordingly, high priority storage requests from each of the functions are routed to a function arbitrated priority queue 412 in accordance with a function arbitration method. The normal priority storage requests from each of the functions are routed to a function arbitrated normal queue 410 in accordance with a similar function arbitration method.

Thus, the initiator transmit module 302 within the adapter integrated circuit 252,254 further includes the function arbitrated normal queue 410, the function arbitrated priority queue 412, and a port output queue 414 coupled together as shown. The function arbitrated normal queue 410 and the function arbitrated priority queue 412 are coupled through the arbitration logic to the respective normal work queues 406A-406X and the priority work queues 408A-408X.

Arbitration logic within the transmit module 302 reads out the high priority storage requests one at a time from the priority work queues 408A-408X for each function in a logical arbitrated manner. The high priority storage requests are received into the function arbitrated priority queue 412. The arbitration method performed by the arbitration logic may be a round robin arbitration, for example, going from one function to the next function of the priority work queues 408A-408X to place high priority storage requests from each function into the function arbitrated priority queue 412 with an arbitrated order. Other known arbitration methods, algorithms, and logic may be used to obtain an arbitrated order of storage requests in the function arbitrated priority queue 412.

Similarly, the arbitration logic within the transmit module 302 reads out the normal priority storage requests one at a time for each function from the normal work queues 406A-406X and stores them into the function arbitrated normal queue 410 in a logical arbitrated manner. The arbitration for the normal priority storage requests may also be a round robin type of arbitration going from one function to the next function to receive normal priority storage requests one at a time from each of the normal work queues 406A-406X for each function to place them into the arbitrated order within the function arbitrated normal queue 410. Other known arbitration methods, algorithms, and logic may be used to obtain an arbitrated order of storage requests in the function arbitrated normal queue 410.

Figure 8C:
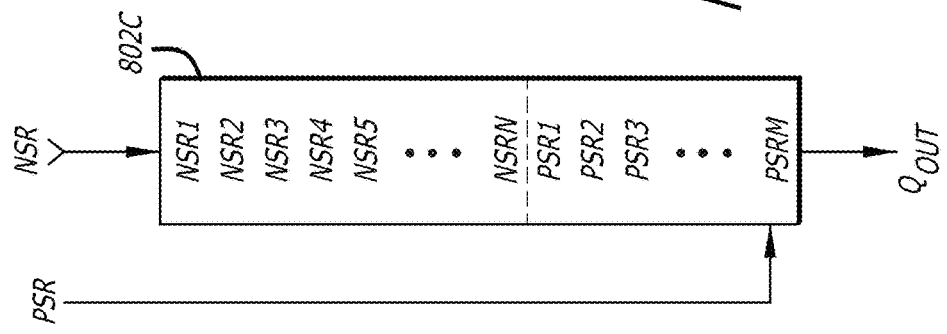
FIGS. 8A, 8B and 8C are block diagrams illustrating the operation of the port output queue processing normal priority storage requests and high priority storage requests.
Figure 8B:
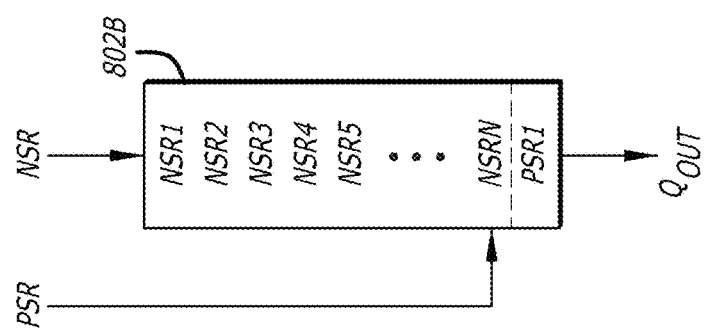
Figure 8A:
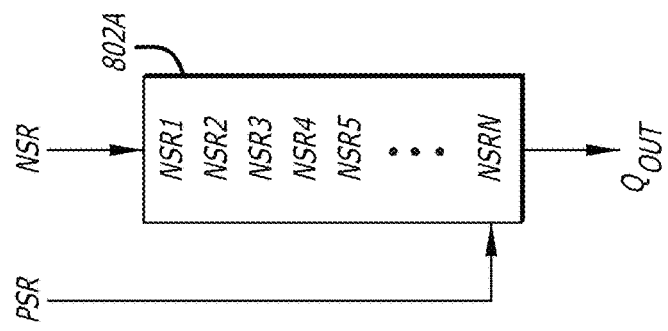

With two queues, the function arbitrated normal queue 410 and the function arbitrated priority queue 412, a further decision is made as to which storage requests from which queue are going to be transmitted out of the storage initiator 312 into the local storage network for service by the storage target. One method of accomplishing this is to provide a large queue with an order that can be varied. Another method provides a variable length queue to provide some elasticity to receive high priority storage requests near the front of the queue and to receive normal priority storage requests at the end of the queue. FIGS. 8A-8C, described further herein, illustrate the functionality of such an output queue. In any case, the output queue 414 is provided such that high priority storage requests from the priority queue 412 are placed near the front of the queue of storage requests so that they are transmitted out onto the wire or cables of the local storage network as soon as possible. With the normal priority storage requests and the high priority storage requests in an order within the final output queue 414, they are ready to be transmitted out through the output port and onto the wires or cables 313 of the storage network 101.

Each of one or more normal priority storage requests from the normal queue 410 are inserted in order into the bottom of the output queue 414. The normal priority storage requests are eventually shifted out from the top of the output queue 414. Each of the one or more high priority storage requests from the priority queue 412 are placed into the output queue 414, in front of the normal priority storage requests so that the high priority storage requests are output sooner to the storage target 314.

The top or output terminal of the port output queue 414 is coupled to wires or cables 313 so that the normal priority and/or high priority storage requests are sent over the local storage network to the various storage targets in the local storage network, such as the storage target 314.

Figure 4B:
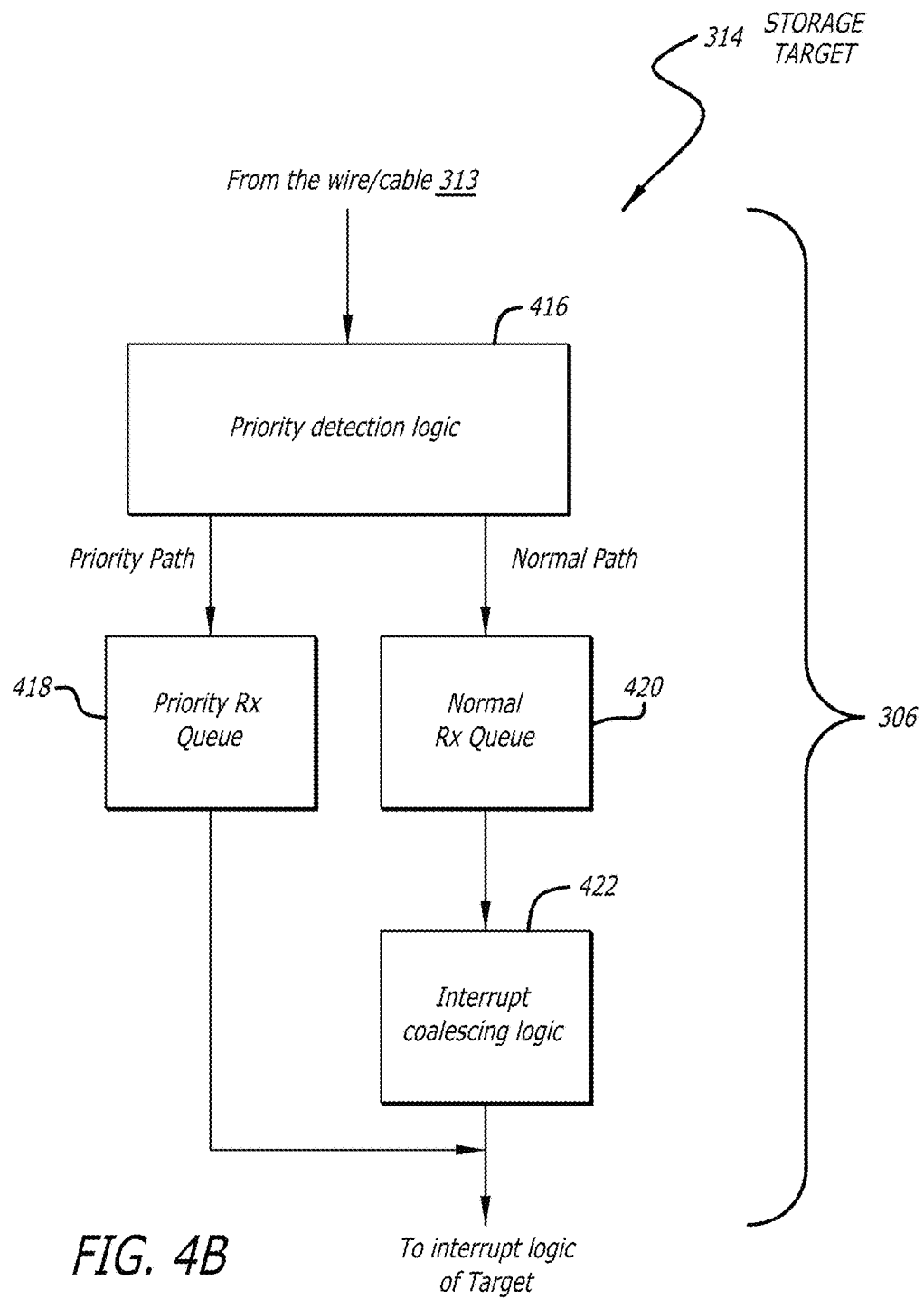
FIG. 4B illustrates a functional block diagram of the reception of storage requests by the storage target from the wire/cable of the storage area network.

Referring now to FIG. 4B, a functional block diagram of the target receive module 306 is now described. The target receive module 306 is within the adapter integrated circuit that is mounted on the Fibre Channel card. The Fibre Channel card is in turn plugged into the storage target 314. Thus, the target receive module 306 depicted in FIG. 4B is within the storage target 314 that receives normal priority and high priority storage requests for the LUNs of its storage array.

The target receive module 306 includes priority detection logic 416, a priority receive queue 418, a normal receive queue 420, and interrupt coalescing logic 422 coupled together as shown. The priority detection logic 416 receives the normal priority and high priority storage requests for the given storage target from the wire or cable 313 of the local storage network. For each storage request that is received, the priority detection logic 416 determines whether or not it is a normal priority storage request or a high priority storage request. The priority detection logic 416 may determine this in various ways given that it knows what type of LUNs are available within the given storage target.

One method of determining that a storage request is a high priority storage request or a normal priority storage request is to inspect the LUN number that is associated with the storage request. For example, if the storage request is for LUN 1 of the tiered storage array 114' in FIG. 2D, the priority detection logic 416 knows this is directed to flash memory devices FM1-FM4 and that it is a high priority storage request. If on the other hand, the storage request is for LUN X of the tiered storage array 114', the priority detection logic 416 knows this is directed to a hard disk drive HDD and that it is a normal priority storage request.

Another method of determining that a storage request is a high priority storage request or a normal priority storage request is to parse and read the priority indicator associated with storage request that is used to prioritize the storage requests. For example, the bits or bytes of the Fibre Channel frame 600 in FIG. 6 are parsed to read the priority indicator 630. If the bits or bytes of the priority indicator are set to indicate high priority, the storage request is determined to be a high priority storage request. If the bits or bytes of the priority indicator are set to indicate normal or low priority, the storage request is determined to be a normal priority storage request.

After the priority detection logic 416 determines that a storage requests is either a normal priority storage request or a high priority storage request, the storage request may take two different paths, a normal priority path or a high priority path, within the target receive module 306. A high priority storage request is sent to the priority receive queue 418 for storage awaiting execution in order. A normal priority storage request is sent to the normal receive queue 420 for storage awaiting execution in order. The priority receive queue 418 and the normal receive queue 420 act as first in first out buffers (FIFO).

To obtain service of a storage request, an interrupt is generated for interrupt logic of the storage target 314 to alert it that a storage request is pending. The interrupt logic of the storage target 314 processes the interrupts in order and provides the requested storage service for the given LUN of a known storage capacity within its storage array.

Accordingly, the next normal priority storage request output from the normal receive queue 420 is typically coupled to the interrupt coalescing logic 422. The interrupt coalescing logic 422 postpones generation of an interrupt signal until several normal priority storage requests are available for the storage target 314. With several normal priority storage requests pending, the receive software driver 352R can more efficiently handle the storage requests. However, coalescing several normal priority storage requests together may increase the latency of the service to such normal priority storage requests. This extra latency may be small compared to the latency of the storage media that is to be accessed at the given LUN by the normal priority storage requests.

Because a lower latency is important for LUNs associated with flash memory devices, the interrupt coalescing logic 422 is often not used for high priority storage requests. The high priority storage requests bypass the interrupt coalescing logic 422 and immediately generate an interrupt signal to alert the storage target that service of the high priority storage request is requested as soon as possible. In this manner, high priority storage requests from the priority receive queue 418 are serviced with a higher priority than the normal priority storage requests from the normal receive queue 420.

After the storage service of a storage request is completed, an acknowledgement or response is sent from the storage target 314 to the storage initiator 312 to indicate that the requested storage service is complete. The acknowledgement or response may further indicate where data may be available for reading by the storage initiator, if a read storage request was being serviced by the storage target. Furthermore, the acknowledgement or response indicates that it is either a high priority acknowledgement or a normal priority acknowledgment (priority response or normal response) for service of a high priority storage request or a normal priority storage requests, respectively. In this manner, the priority acknowledgement associated with a high priority storage request is treated with high priority as it traverses the network back to the storage initiator from the storage target. Accordingly, after the storage target is ready to respond to a storage request (e.g., with read data for a read storage request), similar logic and queues may be provided in the target transmit module 308 of the adapter integrated circuit in the storage target 314 and the initiator receive module 304 of the adapter integrated circuit in the storage initiator 312, to avoid head of line blocking of a high priority acknowledgment or a high priority response.

Figure 5A:
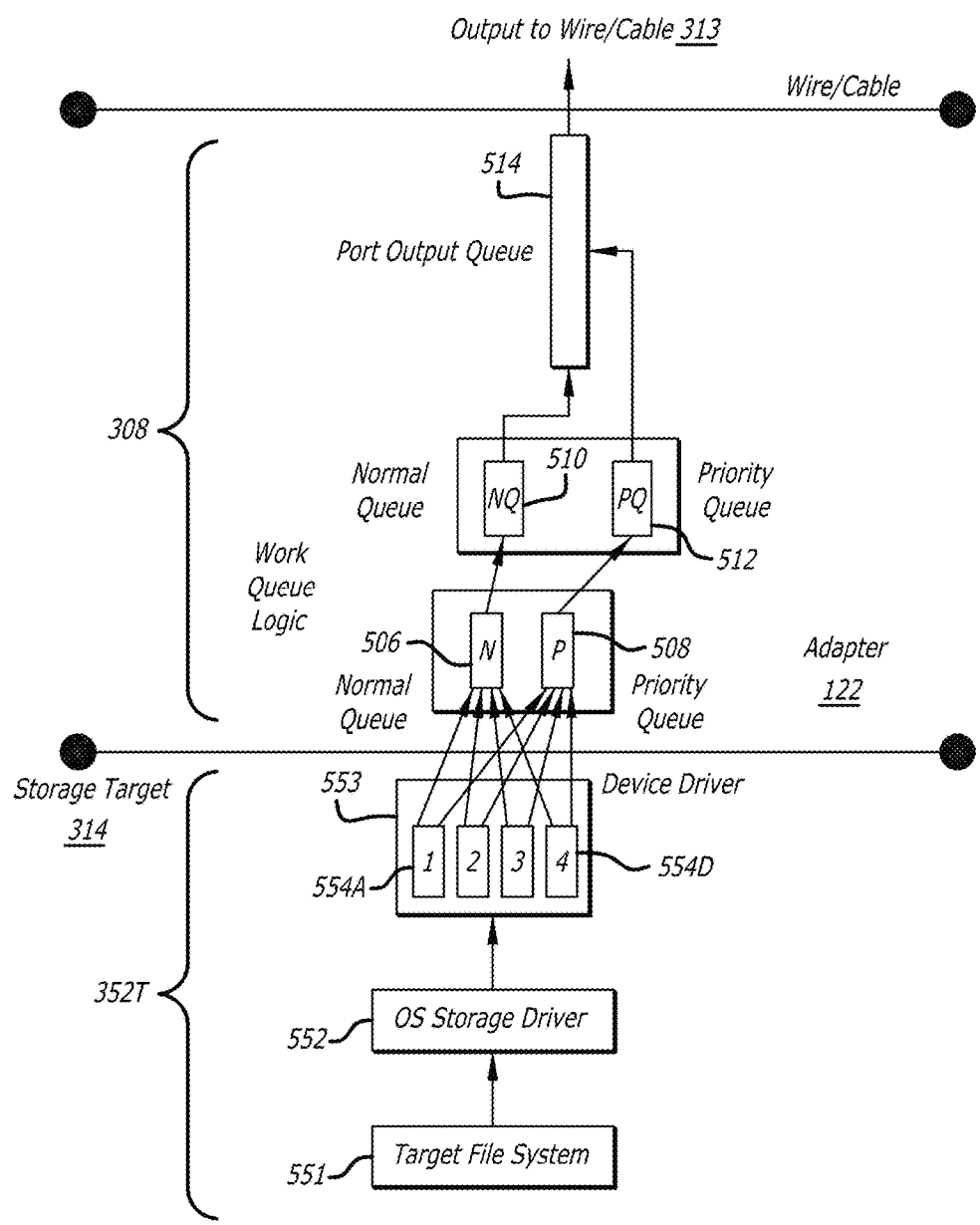
FIG. 5A illustrates a functional block diagram of the transmission of acknowledgments by the storage target onto the wire/cable of the storage area network.

Referring now to the FIG. 5A, a functional block diagram of a portion of the storage target 314, including a target transmit module 308 and a transmit software driver 352T, is illustrated. The transmit software driver 352T includes the target file system 551, the operating system storage driver 552, and the device driver 553.

The device driver 553 forms one or more LUN queues 554A-554D for the one or more LUNs that may be assigned to storage capacity in the storage array. Each LUN has its own queue to hold an order of a plurality of I/O storage requests. The device driver 553 has knowledge of the one or more LUNs and the type of storage media to which they are assigned and thus its priority. For example, a LUN that is assigned to a flashed base storage device, e.g., LUN 1 in the tiered array 114, has higher priority I/O storage requests.

The device driver 553 executed by a processor in the storage target further sets the priority indicator (e.g., prioritization bits or byte) or not of each storage request as they are stored into the one or more LUN queues 554A-554D. Each of the one or more LUN queues 554A-554D may store one or more normal priority storage requests and one or more higher priority storage requests. To properly handle each, the one or more normal priority storage requests and the one or more higher priority storage requests are sorted out from the LUN queues 554A-554D by binning them into a normal work queue 506 and a priority work queue 508 that may be formed by the device driver in the transmit module 308 of the adapter integrated circuit. The I/O high priority storage requests are directed from the LUN queues 554A-554D into the priority work queue 508. The I/O normal priority storage requests are directed from the LUN queues 554A-554D into the normal work queue 506.

As there is only one function performed by the storage target, there are not a plurality of functions generating acknowledgments or responses to storage requests. Accordingly, the transmit module 308 in the storage target 314 is simplified from that of the transmit module 302 in the initiator 312. Arbitrating amongst a plurality of functions is not necessary. Accordingly, a normal function arbitration queue 510 and a priority function arbitration queue 512 may be a part of or extensions of the normal work queue 506 and the priority work queue 508, respectively, in the work queue logic 521 of the transmit module 308.

The normal work queue 506 stores normal priority acknowledgements in a queue for transmission and the priority work queue 508 stores high priority acknowledgements in a queue for transmission. With a simplified circuit, the normal work queue 506 and the priority work queue 508 are in direct communication with the port output queue 514 to transmit the high priority acknowledgements and the normal priority acknowledgements.

Between the normal queue 506,510 and the priority queue 508,512, a decision is made as to which acknowledgements from which queue are going to be transmitted out of the storage target 314 onto the local storage network to the storage initiator. The port output queue 514 is provided, similar to the output queue 414 discussed herein, to prepare the normal priority and high priority storage requests in an order therein so that they are ready to be transmitted out through the output port and onto the wires or cables 313 of the storage network.

The port output queue 514 may be a large queue that receives acknowledgements with an order of the priority acknowledgments that can be varied. In an alternate embodiment, the port output queue 515 is a multiplexing variable length queue to provide some elasticity to receive priority acknowledgements near the front of the queue and to receive normal acknowledgements at the end of the queue. FIGS. 8A-8C, described further herein, illustrate the functionality of such a port output queue. In any case, the port output queue 514 is provided such that high priority acknowledgements from the priority queue 508,512 are placed near the front of the queue of normal priority and high priority acknowledgements so that they are transmitted out onto the wire or cables of the local storage network as soon as possible. With the normal priority and high priority acknowledgements in an order within the final output queue 514, they are ready to be transmitted out through the output port and onto the wires or cables 313 of the storage network.

Each of one or more normal priority acknowledgements from the normal queue 506,510 are inserted in order into the bottom of the output queue 514. The normal priority acknowledgements are eventually shifted out from the top of the output queue 514. Each of the one or more high priority acknowledgements from the priority queue 508,512 are placed into the output queue 514, in front of the normal priority acknowledgements so that the high priority acknowledgements are output sooner to the initiator 312.

The top or output terminal of the port output queue 514 is coupled to wires or cables 313 so that the normal priority and/or high priority acknowledgements can be sent over the local storage network to the various storage initiators in the local storage network, such as the storage initiator 312, to indicate their execution. The storage initiator 312 includes an initiator receiver circuit 304 to receive and process the normal priority and/or high priority acknowledgements received off of the wires or cables 313 from the storage targets in the local storage network that process its storage requests.

Figure 5B:
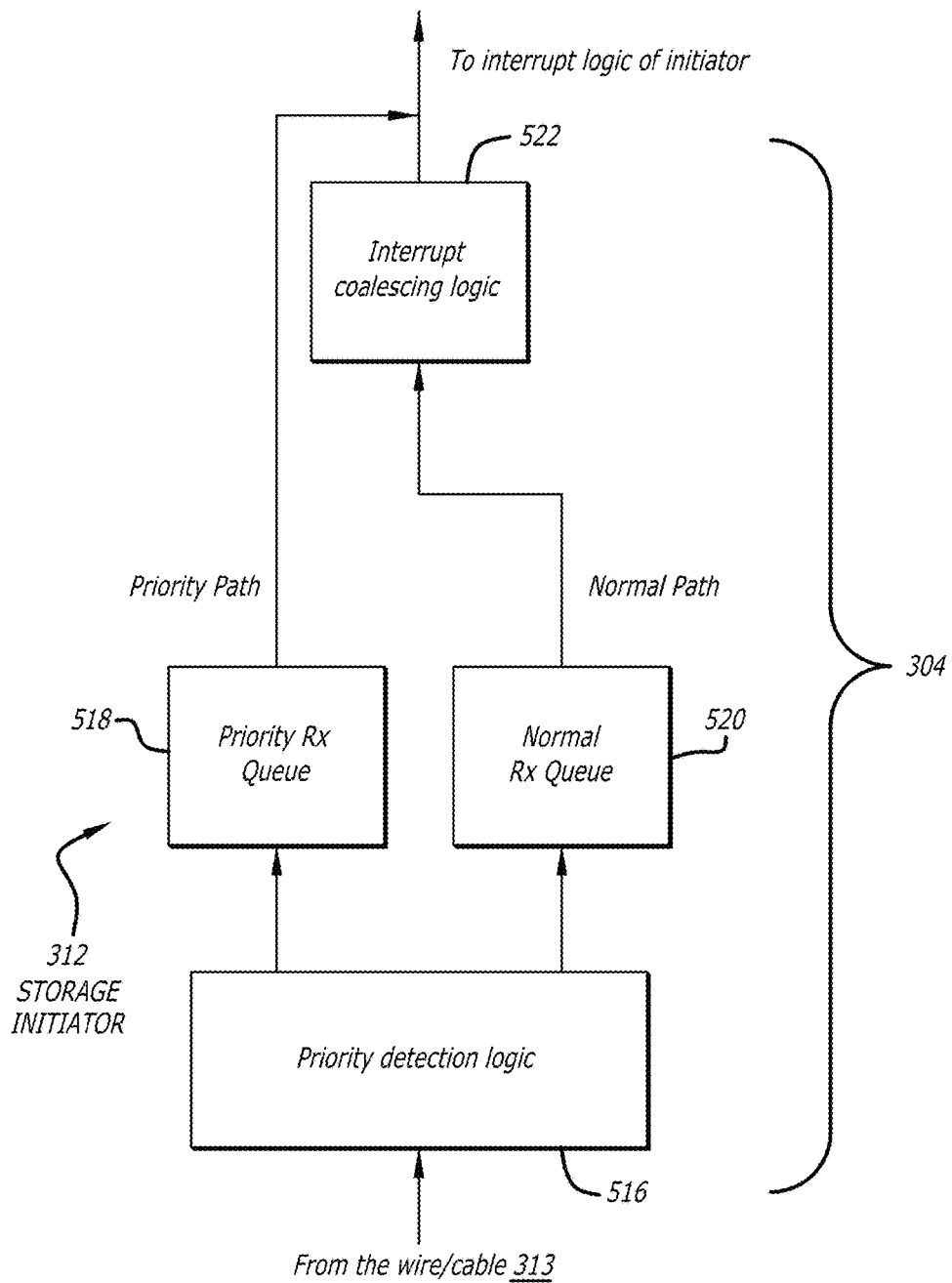
FIG. 5B illustrates a functional block diagram of the reception of acknowledgements by the storage initiator from the wire or cable of the storage area network.

Referring now to FIG. 5B, a functional block diagram of the initiator receiver module 304 is shown. The initiator receiver module 304 of FIG. 5B is very similar to the target receiver module 306 shown in FIG. 4B except for the signals that are processed. The initiator receiver module 304 processes received acknowledgments or responses while the target receiver module 306 processes storage requests.

The initiator receiver module 304 includes priority detection logic 516, a priority receive queue 518, a normal receive queue 520, and interrupt coalescing logic 522 coupled together as shown. The priority detection logic 516 receives the normal priority and high priority acknowledgments from various storage targets in the local storage network over the wire or cable 313. For each acknowledgment that is received, the priority detection logic 516 determines whether or not it is a normal priority acknowledgment or a high priority acknowledgment. The priority detection logic 516 may determine this in various ways if it knows what type of LUNs are available within the given storage target from which the acknowledgment was received.

One method of determining whether an acknowledgment is a high priority acknowledgment or a normal priority acknowledgment is to inspect the LUN number that is associated with the acknowledgment. For example, if the acknowledgment is for LUN 1 of the tiered storage array 114' in FIG. 2D, the priority detection logic 516 knows the original storage request was directed to flash memory devices FM1-FM4 and that it is a high priority acknowledgment. If on the other hand, the acknowledgment is for LUN X of the tiered storage array 114', the priority detection logic 516 knows this is directed to a hard disk drive HDD and that it is a normal priority acknowledgment.

Another method of determining that an acknowledgment is a high priority acknowledgment or a normal priority acknowledgment is to parse and read the priority indicator associated with the acknowledgment. For example, the bits or bytes of the Fibre Channel frame 600 in FIG. 6 are parsed to read the priority indicator 630. If the bits or bytes of the priority indicator are set to indicate high priority, the acknowledgment is determined to be a high priority acknowledgment. If the bits or bytes of the priority indicator are set to indicate normal or low priority, the acknowledgment is determined to be a normal priority acknowledgment.

After the priority detection logic 516 determines that an acknowledgment is either a normal priority acknowledgment or a high priority acknowledgment, the acknowledgment may take two different paths, a normal path or a priority path, within the initiator receive module 304. A high priority acknowledgment is sent to the priority receive queue 518 for storage requests awaiting execution in order. A normal priority acknowledgment is sent to the normal priority receive queue 520 for storage awaiting execution in order. The priority receive queue 518 and the normal receive queue 520 act as first in first out buffers (FIFO).

To obtain service of an acknowledgment, an interrupt is generated for interrupt logic of the storage initiator 312 to alert it that an acknowledgment is pending. The interrupt logic of the storage initiator 312 processes the interrupts in order and processes the acknowledgment. This may be as simple as informing a given function that its data was stored. Alternatively, data may have been directly memory accessed into memory and is waiting for a given function to be granted access with its starting memory location.

Accordingly, the next acknowledgment output from the normal priority receive queue 520 is typically coupled to the interrupt coalescing logic 522. The interrupt coalescing logic 522 postpones generation of an interrupt signal until several normal priority acknowledgments are available for the storage initiator 312. With several normal priority acknowledgments pending, the receive software driver 351R can more efficiently handle the acknowledgments. However, coalescing several normal priority acknowledgments together may increase the latency of the service to such normal priority acknowledgments.

Because a lower latency is important for LUNs associated with flash memory devices, the interrupt coalescing logic 522 is not used for higher priority acknowledgments. The higher priority acknowledgments bypass the interrupt coalescing logic 522 and immediately generate an interrupt signal to alert the storage initiator that service of the higher priority acknowledgment is requested as soon as possible. In this manner, higher priority acknowledgments from the priority receive queue 518 are serviced with a higher priority than the normal priority acknowledgments from the normal priority receive queue 520.

Exemplary Work, Arbitration, and Output Queues

The work queues and output queues in the modules can be implemented in different ways. Exemplary implementations of the work queues and output queues are now shown and described.

Figure 7A:
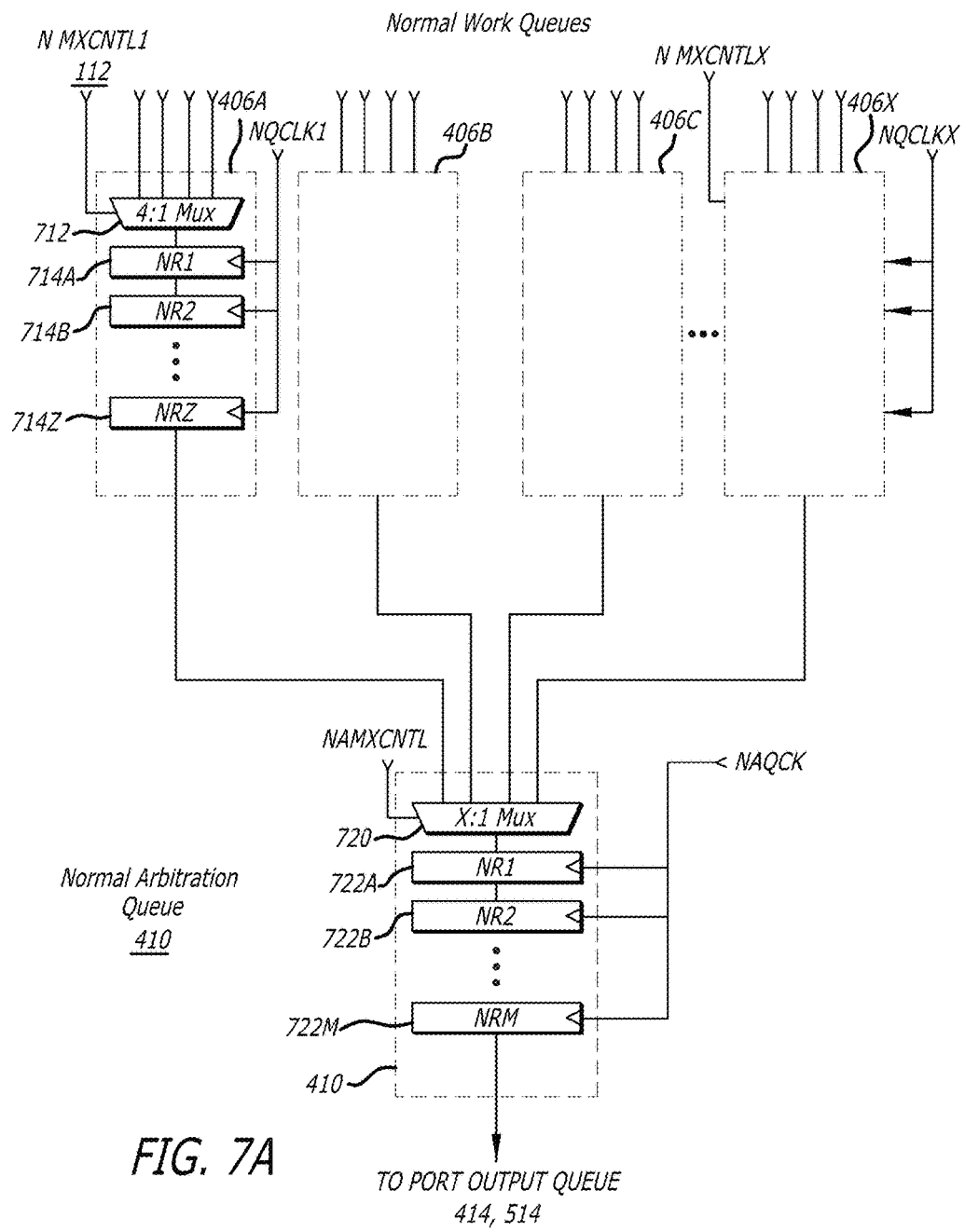
FIG. 7A illustrates a functional block diagram of an example implementation of normal queues for processing normal priority storage requests.

Referring now to FIG. 7A, a functional block diagram illustrates exemplary normal work queues 406A-406X coupled to an exemplary normal function arbitration queue 410 within the transmit module 302 for processing normal priority storage requests.

Each normal work queue 406A-406X (collectively referred to as 406) includes a four to one multiplexer 712 (assuming four logical units (LUNs) per function) and a plurality of clocked registers NR1-NRX, 714A-714X coupled in series together to form a shift register and receive a plurality of normal priority storage requests in a first in first out mode (FIFO). The first clocked register 714A has its input coupled to the output of the multiplexer 712. The output of the last clocked register 714X is coupled to the normal function arbitration queue 410. A normal queue clock NQCLK (NQCLKA-NQCLKX one clock for each normal work queue) is used to periodically clock the plurality of registers 714A-714Z and shift in a normal priority storage request while shifting out the last normal priority storage request from register 714Z. A first set of multiplexer control signals MXCNTL1 are used to control the four to one multiplexer 712 to selectively receive normal priority storage requests from the outputs of each of the four LUN queues 454A-454D to which the inputs of the multiplexer 712 are coupled.

The normal function arbitration queue 410 includes an X to one multiplexer (X:1 Mux) 720 with X inputs to receive an output from each of the X normal work queues 406A-406X. A second set of multiplexer control signals MXCNTL2 are used to control the X to one multiplexer (X:1 Mux) 720 to selectively receive normal priority storage requests from the outputs of each of the X normal work queues. Arbitration logic can generate the multiplexer control signal MXCNTL2 in accordance with how storage requests from each of the functions is to be arbitrated in order. In one embodiment, a round robin arbitration is performed such that the multiplexer 720 can receive a storage request from one normal work queue to the next and back around again from work queue 406X to work queue 406A repeatedly. The normal function arbitration queue 410 further includes a plurality of M clocked registers NR1-NRM 722A-722M coupled in series together as shown. The plurality of M clocked registers 722A-722M are each clocked by an arbitration queue clock AQCK. The first clock register 722A has its input coupled to the output of the multiplexer 720. The output of the last clocked register 722M is coupled to the normal priority storage request input of the port output queue 414, 514.

The storage requests generated by the device driver 453 are stored in the 4 per logical unit LUN queues for each function. The multiplexer 712 in each of the normal work queues 406A-406X selectively groups, consolidates or funnels the normal priority storage request from each LUN queue of each function into a clocked shift register formed by the registers 714A-714Z.

The normal priority storage requests in each of the normal work queues 406A-406X are further selectively grouped, consolidated or funneled down into a shift register by the multiplexer 720 in a function arbitrated order.

The normal queue clocks NQCLKA-NQCLKX of the normal work queues 406A-406X, the arbitration queue clock AQCK, and the sets of multiplexor control signals are selectively controlled to provided an ordered output of normal priority storage requests from the output of the last clocked register 722M in the normal function arbitration queue 410.

Figure 7B:
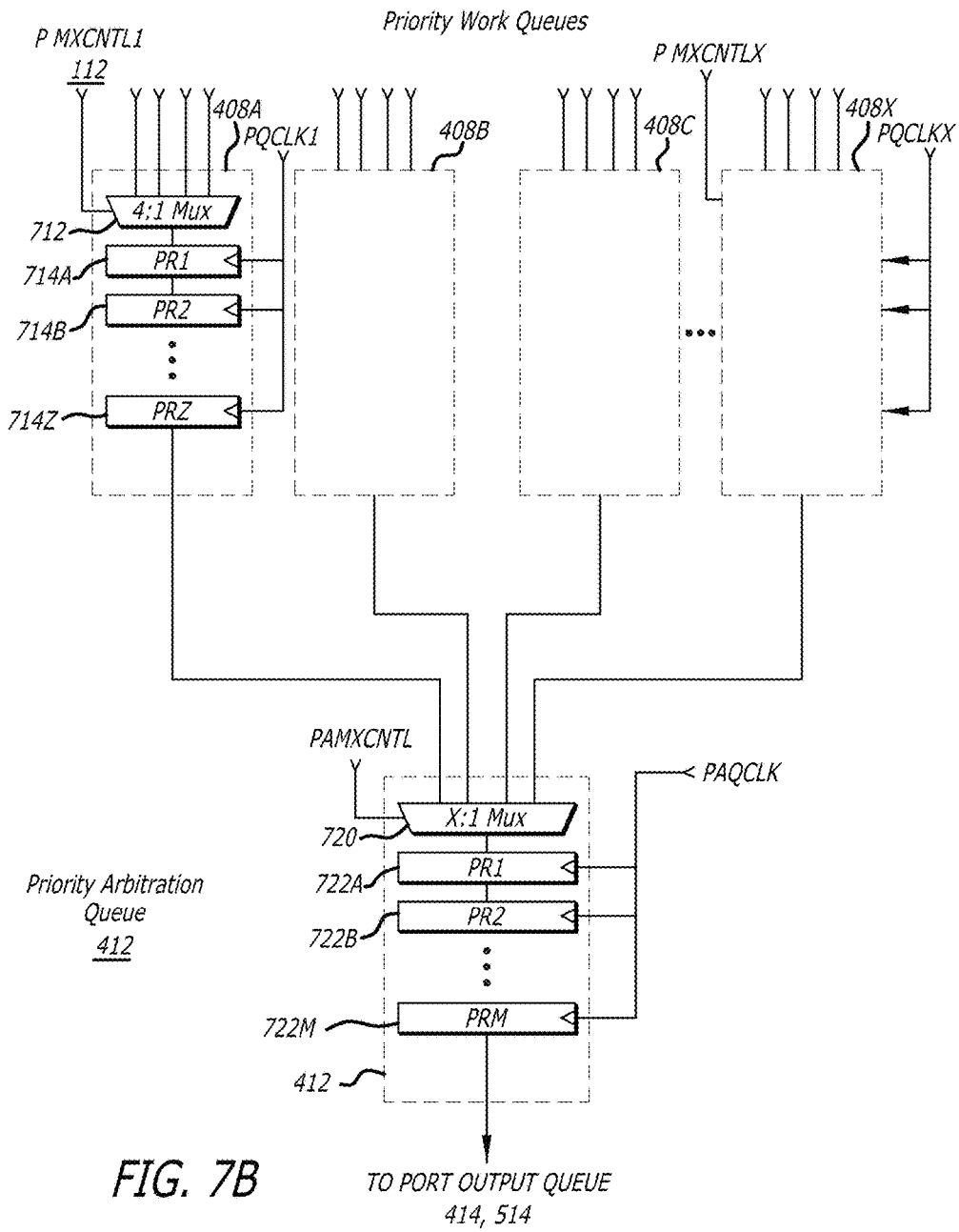
FIG. 7B illustrates a functional block diagram of an example implementation of priority queues for processing high priority storage requests.

Referring now to FIG. 7B, a functional block diagram illustrates exemplary priority work queues 408A-408X coupled to an exemplary priority function arbitration queue 412 within the transmit module 302 for processing higher priority storage requests. The exemplary priority work queues 408A-408X coupled to the exemplary priority function arbitration queue 412 within the transmit module 302 are constructed and function similar to the exemplary normal work queues 406A-406X coupled to an exemplary normal function arbitration queue 410 described previously.

There is a difference in the connection to priority work queues 408A-408X and the output of the priority function arbitration queue 412 to the priority storage request input of the multiplexing variable length shift register 703 shown in FIG. 7C. For example, the output of the last clocked register 722M in the higher priority function arbitration queue 412 is coupled to the higher priority storage request input of the port output queue 414,514. Furthermore, the control signals and clock signals to the multiplexers and registers may be generated differently due to the higher priority handling of the higher priority storage requests. The discussion regarding the exemplary normal work queues 406A-406X and the exemplary normal function arbitration queue 410 applies to the priority work queues 408A-408X and the priority function arbitration queue 412 and is thus incorporated herein by reference for reasons of brevity.

Referring now to FIG. 7C, a functional block diagram illustrates an exemplary port output queue 414, 514 within the transmit module 302, 308. FIG. 7C illustrates a constant length shift register 701 coupled to a multiplexing variable length shift register 703. The combination of the two shift registers that forms overall a multiplexing variable length shift register with a minimal length of X registers and a maximum length of X+Y registers.

The constant length shift register 701 includes a plurality of X clocked registers NR1-NRX, 702A-702X coupled in series together to form a constant length shift register of X registers. The X clocked registers NR1-NRX, 702A-702X receive a plurality of normal priority storage requests in a first in first out mode. The first clocked register 702A has its input coupled to the output of the normal functional arbitration queue 410. The output of the last clocked register 702X is coupled to an input of a two to one multiplexer 704A in the multiplexing variable length shift register 703.

The multiplexing variable length shift register 703 includes a plurality of Y multiplexed-registers 704A/706A-704Y/706Y coupled in series together. Each of the multiplexers 704A-704Y is a two to one multiplexer (2:1 MUX) having one data input coupled to the high priority storage request input. The multiplexer 704A has a second data input coupled to the output of the last clocked register 702X in the constant length register 701. The other tow to one multiplexers (2:1 MUX) 704B-704Y each have a second data input coupled the output of the prior clocked register (PR1-PRY) 706A-706X. The data output of each multiplexer 704A-704Y is coupled to the data input of each matched clocked register 706A-706Y. Each of the two-to-one multiplexers 704A-704Y has a control or select input coupled to a respective control signal MK1-MKY (collectively OMX-CNTL1) to select one of the two input signals at its output.

The multiplexing variable length shift register 703 further includes an (Y+1) to one multiplexer ((Y+1):1 MUX) 708 having an input coupled to the output of each of the plurality of Y multiplexed-registers 704A/706A-704Y/706Y and one additional input coupled to the output of the last register 702X in the constant length shift register 701. The (Y+1) to one multiplexer 708 has a plurality of control inputs to receive a plurality of control signals OMXCNTL2 so that one of the Y+1 inputs can be selected as its output signal. The storage request (or acknowledgement) output from the multiplexer 708 is driven out onto the wire or cable 313.

A normal queue clock NQCLK is used to periodically clock the plurality of registers 702A-702X to shift in a normal priority storage request into register 702A while shifting out the last normal priority storage request from register 702X. The mux control signals MK1-MKY are used to vary the length of the variable length shift register and to insert high priority storage requests in front of normal priority storage requests in the output queue. In conjunction with the mux control signals MK1-MKY, the priority queue clocks PQCLK1-PQCLKM, one for each respective register 706A-706Y, are used to independently clock one or more of the plurality of registers 706A-706Y to shift in a high priority storage request while shifting out a high priority storage request from one of the registers 706A-706Y. For example, to store a high priority storage request into register 706A, the mux control signal M1 selects the high priority storage request input and the register 706A is clocked by the priority clock signal PQCLK1. If a high priority storage request in register 706Y is to be shifted out, the mux control signals OMXCNTL2 into the multiplexer 708 are set to select the output from register 706Y as the output from the queue. If no high priority storage requests are in the queue, the mux control signals OMXCNTL2 into the multiplexer 708 are set to select the last normal priority storage request output from the register 702N.

Control logic (not shown) is used to generate the mux control signals and the clock signals to control the port output queue to shift in the normal priority storage requests from the normal functional arbitration queue 410 as well as shift in the high priority storage requests from the priority functional arbitration queue 412 in order ahead of the normal priority storage requests. Control logic is further used to generate the mux control signals and clocks to shift out high priority storage requests stored in the registers 706A-706Y ahead of the normal priority storage requests stored in the registers 702A-702X. Control logic is further used to synchronize the generation of the multiplexer control signals and the clock signals so that a balance is obtained between shifting out storage requests and shifting in storage requests so that there is no overflow of the port output queue. Control logic may be further responsive to the number of high priority storage requests, the number of normal priority storage requests, and a waiting time of each.

Referring now to FIGS. 8A-8C, block diagrams illustrate the functionality of the port output queue 414,514 that may be implemented by the multiplexing variable length shift register. The port output queue stores normal priority and high priority storage requests in order for processing.

In FIG. 8A, the variable length shift register 802A has normal priority storage requests NSR1-NSRN stored therein from front to back. The normal priority storage request NSRN is ready to be shifted out onto the wire or cables in the local storage network. No high priority storage requests are stored in the variable length shift register 802A.

In FIG. 8B, the variable length shift register 802B has a plurality of normal priority storage requests NSR1-NSRN and one high priority storage request PSR1 stored therein. The one high priority storage request PSR1 was inserted into the variable length shift register before the last normal priority storage request NSRN causing it to grow slightly. In this manner, the high priority storage requests can be processed before the normal priority storage request NSRN in the queue. The high priority storage request PSR1 disrupts the process flow of the normal priority storage requests NSRN-NSR1 until it has been completed.

In FIG. 8C, the variable length shift register 802C has the same plurality of normal priority storage requests of NSR1-NSRN as before. However, the variable length shift register 802C also has a plurality of high priority storage requests PSR1-PSRM stored in front of the plurality of normal priority storage requests of NSR1-NSRN. The plurality of high priority storage requests PSR1-PSRM are shifted out of the variable length shift register 802C for processing before the plurality of normal priority storage requests of NSR1-NSRN. The variable length shift register 802C illustrates its growth in length to store the plurality of high priority storage requests PSR1-PRSM in front of the normal priority storage requests NSR1-NSRN. The normal priority storage requests are not processed until the high priority storage requests have all been shifted out.

The block diagram of the circuits for handling the acknowledgements in the transmit circuit 308 is simpler than that shown in FIGS. 7A-7C. A single normal work queue (e.g. normal work queue 406A illustrated in FIG. 7A) and a single priority work queue (e.g. priority work queue 408A illustrated in FIG. 7B) can be directly coupled to the variable length shift register (the port output queue shown in FIG. 7C.

Priority queuing allows priority to faster resources such as flash based storage arrays that provide flash based logical units of storage capacity. Flash based storage arrays do not have an average seek time that rotating media does (typically a number of milliseconds). Thus, flash based storage arrays have lower access latency. Accordingly, the priority queuing model segregates the traffic of storage requests by logical unit and storage type. Logical units with flash based or faster memory storage capacity enjoy end-to-end prioritization of their storage requests and acknowledgements. One of ordinary skill recognizes additional embodiments of priority queuing including, for instance, a spectrum of priorities in addition to high, normal and/or low priority storage requests and/or acknowledgements.

Other aspects of optimizing a storage area network include message passing, protected writes, cache prefills, improved virtual machine migration, and read auto copy.

Message passing provides a means for in band message passing that allows flash devices to coordinate and communicate using inband mechanisms. In this manner, latencies are avoided that otherwise may be induced when another network (and associated software stack) is used to send messages.

Protected writes solves the problem when multiple servers, each of which that have flash-based caching, have access to the same logical unit, a shard LUN. If the first server writes data to the shared LUN, and the second server has a previous version of that data in its cache, the second server's cache is now stale, resulting in the risk of corrupted data on the second server. The method and apparatus for protected writes sends a cache invalidate message from the first server to the second server before allowing the write to go through. This ensures that the above described data corruption does not occur when a shared LUN that is flashed based is employed.

Cache prefill involves using a message passing mechanism to provide hints to a caching device (referred to as cache hints) that are based on some prior knowledge of that device's behavior. The cache hints are provided in the form of reference instead of actually pushing the data itself.

Improved virtual machine migration uses the cache hints described above to quickly warm up a cache when a virtual machine is migrated from one physical server to another. Since the cache hints are provided for reference, virtual machine migration can take place quickly.

Read auto copy is a feature of the host-based or storage initiator adapter card. Read auto copy is directed at network-resident appliances that perform a caching function, also referred to as a cache appliance. The read-auto copy, when commanded by the caching software and or hardware, automatically forwards read data to the cache appliance, thereby saving the step of sending a write command in the host server or storage initiator.

The foregoing offloads various functionality in a storage area network from the end-point devices to provide improved function particularly in a storage network that includes flash memory based storage devices.

Various specific materials, designs, dimensions, etc. are provided and are considered highly beneficial embodiments of the present disclosure in one regard. However, in other regard, such specifics are also merely illustrative of broader aspects of the present disclosure and should not be considered to necessarily limit to such broader aspects unless expressly specified to be required. In particular, the various specific dimensions provided as such examples are intended to be about any particular values provided, with typical tolerances and ranges of suitable alternatives as are apparent to one of ordinary skill. Where particular combinations of such dimensions are provided for exemplary illustration of certain embodiments, the relative relationships between them are also contemplated as having been herein disclosed as additional beneficial aspects (even if the specific values of the relative dimensions change). For example, certain lengths, widths, and/or depths of particular components shown and described for a particular assembly provide overall geometries which may be varied by changing certain sub-sets of such dimensions, but may also be fixed relative to the ratios of these values despite the valued changing (so long as their general relationship remains). Similarly, such dimensions of different component parts also have similar relative relationships which are similarly contemplated, also as apparent to one of ordinary skill.

When implemented in software, the elements of the embodiments of the invention are essentially the code segments or instructions to perform the functional tasks described herein. The code segments or instructions are executable by a processor, such as processor 201 of FIG. 2G and can be stored in a storage device or a processor readable storage medium, such as memory 205 of FIG. 2G, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, a hard disk. The code segments or instructions may be downloaded via computer networks such as the Internet, Intranet, etc. into the processor readable storage medium.

Various combinations and sub-combinations, and modifications as may be made, of the presently disclosed components and embodiments and aspects are contemplated whether or not specifically disclosed hereunder, to the extent and as are apparent to one of ordinary skill based upon review of this disclosure and in order to suit a particular intended purpose or application.

While embodiments been particularly described, they should not be construed as limited, but rather construed according to the claims that follow below.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A method for a storage area network comprising:
   with a processor in a storage initiator, setting a priority indicator in a signal of a storage request to form a high priority storage request for a storage target in the storage area network;
   transmitting the high priority storage request before a normal priority storage request;
      wherein the high priority storage request traverses the storage area network to the storage target with a higher priority than a normal priority storage request,
      wherein the normal priority storage request is processed by interrupt coalescing logic while travelling to the storage target whereas the high priority storage request bypasses the interrupt coalescing logic while travelling to the storage target, and
      wherein the transmitting includes continuing to transmit high priority storage requests while postponing transmission of the normal priority storage request until a predetermined number of normal priority storage requests are pending at the interrupt coalescing logic, and interrupting transmission of the high priority storage requests and transmitting the normal priority storage request when the predetermined number of normal priority storage requests is reached; and
   prior to transmitting the normal priority storage request, storing the normal priority storage request in a normal priority queue, wherein the normal priority queue includes a first queue coupled to a second queue,
   wherein the first queue includes:
      a first multiplexer that receives the normal priority storage request; and
      a first plurality of registers coupled to the first multiplexer and connected in series, wherein the first plurality of registers are driven by a first normal priority clock, wherein the first multiplexer is driven by a first set of control signals,
   wherein the second queue includes:
      a second multiplexer that receives an output of the first queue; and
      a second plurality of registers coupled to the second multiplexer and connected in series, wherein the second plurality of registers are driven by a second normal priority clock, wherein the second multiplexer is driven by a second set of control signals.

2. The method of claim 1, further comprising:
   receiving the high priority storage request; and executing the high priority storage request prior to executing at least one normal priority storage request.

3. The method of claim 1, further comprising:
with a processor in the storage target, setting a priority indicator in a data frame of an acknowledgement signal to form a priority acknowledgement;
transmitting the priority acknowledgement before a normal acknowledgement; and
wherein the priority acknowledgement traverses the storage area network with a higher priority than a normal acknowledgement to the initiator.

4. The method of claim 1, wherein transmitting the high priority storage request before the normal priority storage request includes
placing the high priority storage request near the front of a queue of one or more storage requests.

5. The method of claim 1, wherein transmitting the high priority storage request before the normal priority storage request includes
receiving a plurality of high priority storage requests from a plurality of functions into a priority queue;
receiving a plurality of normal priority storage requests from the plurality of functions into a normal queue; and
inserting each of the plurality of normal priority storage requests from the normal queue into the bottom of an output queue; and
placing each of the plurality of high priority storage requests from the priority queue into the output queue in front of the plurality of normal priority storage requests.

6. The method of claim 1, further comprising:
prior to transmitting the high priority storage request, storing the high priority storage request in a high priority queue, wherein the high priority queue includes a third queue coupled to a fourth queue, wherein the third queue includes:
a third multiplexer that receives the high priority storage request; and
a third plurality of registers coupled to the third multiplexer and connected in series, wherein the third plurality of registers are driven by a first high priority clock, wherein the third multiplexer is driven by a third set of control signals, wherein the fourth queue includes:
a fourth multiplexer that receives an output of the third queue; and
a fourth plurality of registers coupled to the fourth multiplexer and connected in series, wherein the fourth plurality of registers are driven by a second high priority clock, wherein the fourth multiplexer is driven by a fourth set of control signals.

7. The method of claim 1, wherein the priority indicator is a bit in a priority field of a Fibre Channel frame.

8. The method of claim 7, wherein the high priority storage request traverses in-band over a Fibre Channel cable of the storage area network.

9. The method of claim 7, wherein the high priority storage request traverses over an Ethernet cable of the storage area network.

10. The method of claim 1, wherein the priority indicator is a bit in a priority field of an iSCSI message.

11. The method of claim 10, wherein the high priority storage request traverses in-band over a SCSI cable of the storage area network.

12. The method of claim 1, wherein the priority indicator is a bit in a priority field of an iSCSI message.

13. The method of claim 12, wherein the high priority storage request traverses in-band over a SCSI cable of the storage area network.

14. A method for a storage area network comprising:
with a processor in a storage initiator, setting a priority indicator in a signal of a storage request to form a high priority storage request for a storage target in the storage area network; and
transmitting the high priority storage request before a normal priority storage request;
wherein the high priority storage request traverses the storage area network to the storage target with a higher priority than a normal priority storage request,
wherein the normal priority storage request is processed by interrupt coalescing logic while travelling to the storage target whereas the high priority storage request bypasses the interrupt coalescing logic while travelling to the storage target, and
wherein the normal priority storage request and the high priority storage request are binned into a normal work queue and a priority work queue, respectively, from a plurality of Logical Unit (LUN) queues, each of the plurality of LUN queues belonging to a respective LUN that includes one or more assigned storage devices,
wherein the normal priority storage request and high priority storage request are passed from the normal work queue and priority work queue, respectively, to a port output queue such that the high priority storage request is nearer a front of the port output queue than the normal priority storage request,
wherein the port output queue includes a constant length shift register coupled to a variable length shift register,
wherein the constant length shift register receives the normal priority storage request, and
wherein the variable length shift register receives the high priority storage request and an output of the constant length shift register.

15. The method of claim 14, wherein the high priority storage request is shifted out of the port output queue prior to the normal priority storage request, wherein the constant length shift register includes a first plurality of registers connected in series and driven by a normal queue clock, wherein the variable length shift register includes a plurality of multiplexers and a second plurality of registers, wherein each of the second plurality of registers is coupled between a respective pair of the plurality of multiplexers, wherein each of the second plurality of registers is driven by a respective priority queue clock, wherein each of the plurality of multiplexers receives the priority storage request and either the output of the constant length shift register or an output from one of the second plurality of registers.

16. The method of claim 14, wherein all high priority storage requests in the port output queue are shifted out of the port output queue prior to shifting out the normal priority storage request.

17. A method for a storage area network comprising:
with a processor in a storage initiator, setting a priority indicator in a signal of a storage request to form a high priority storage request for a storage target in the storage area network; and
transmitting the high priority storage request before a normal priority storage request;
wherein the high priority storage request traverses the storage area network to the storage target with a higher priority than a normal priority storage request,
wherein the normal priority storage request is processed by interrupt coalescing logic while travelling to the storage target whereas the high priority storage request bypasses the interrupt coalescing logic while travelling to the storage target, wherein storage devices in the storage target are assigned to at least one Logical Unit (LUN) from among a plurality of LUNs based on a type of the storage devices, wherein each of the plurality of LUNs have an associated LUN queue to hold a plurality of storage requests, wherein each LUN queue is associated with one of a plurality of functions of the storage initiator, wherein if a given LUN queue contains one or more high priority storage requests and one or more normal priority storage requests, then the method further comprises:
- binning the one or more normal priority storage requests from the given LUN queue into a normal work queue; and
- binning the one or more high priority storage requests from the given LUN queue into a priority work queue, and wherein the normal work queue includes:
- a plurality of first queues that receive the one or more normal priority storage requests and that are driven by a first set of control signals; and
- a second queue that receives outputs of the plurality of first queues and that is driven by a second set of control signals, and wherein the priority work queue includes:
- a plurality of third queues that receive the one or more high priority storage requests and that are driven by a third set of control signals; and
- a fourth queue that receives outputs of the plurality of first third queues and that is driven by a fourth set of control signals.

18. The method of claim 17, wherein the type of storage devices includes fast storage devices and slow storage devices, and wherein each of the plurality of functions is a different virtual operating system.

19. The method of claim 1, wherein the normal priority storage request and high priority storage request are passed from the normal work queue and priority work queue, respectively, to a port output queue such that the high priority storage request is nearer a front of the port output queue than the normal priority storage request, wherein the port output queue includes a constant length shift register coupled to a variable length shift register, wherein the constant length shift register receives the normal priority storage request, and wherein the variable length shift register receives the high priority storage request and an output of the constant length shift register.

20. The method of claim 14, further comprising:

prior to transmitting the normal priority storage request, storing the normal priority storage request in a normal priority queue, wherein the normal priority queue includes a first queue coupled to a second queue, wherein the first queue includes:
- a first multiplexer that receives the normal priority storage request; and
- a first plurality of registers coupled to the first multiplexer and connected in series, wherein the first plurality of registers are driven by a first normal priority clock, wherein the first multiplexer is driven by a first set of control signals, wherein the second queue includes:
- a second multiplexer that receives an output of the first queue; and
- a second plurality of registers coupled to the second multiplexer and connected in series, wherein the second plurality of registers are driven by a second normal priority clock, wherein the second multiplexer is driven by a second set of control signals.

\* \* \* \* \*